United States Patent

Ohshima et al.

[11] Patent Number: 5,838,291
[45] Date of Patent: Nov. 17, 1998

[54] DISPLAY CONTROL METHOD AND APPARATUS

[75] Inventors: Masamichi Ohshima, Tokyo; Kenzoh Ina; Toshiyuki Nobutani, both of Yokohama; Masami Shimakura, Tokyo; Junichi Tanahashi, Yokohama; Kenichiro Ono, Kawasaki; Hajime Morimoto, Tokyo; Tatsuya Sakashita, Yokohama; Eiichi Matsuzaki, Kawasaki, all of Japan

[73] Assignee: Canon Kabushiki Kaisha, Tokyo, Japan

[21] Appl. No.: 397,714

[22] Filed: Mar. 2, 1995

Related U.S. Application Data

[63] Continuation of Ser. No. 62,344, May 17, 1993, abandoned.

[30] Foreign Application Priority Data

| May 19, 1992 | [JP] | Japan | 4-126143 |
| May 19, 1992 | [JP] | Japan | 4-126164 |
| May 19, 1992 | [JP] | Japan | 4-126168 |

[51] Int. Cl.⁶ ........................................ G09G 3/36
[52] U.S. Cl. .................. 345/97; 345/89; 345/153; 345/155
[58] Field of Search .................. 358/455, 456, 358/457; 345/97, 88, 89, 147, 153, 155

[56] References Cited

U.S. PATENT DOCUMENTS

| 4,964,699 | 10/1990 | Inoue | 350/332 |
| 5,018,024 | 5/1991 | Tanioka | 358/457 |
| 5,111,194 | 5/1992 | Oneda | 345/147 |
| 5,189,406 | 2/1993 | Humphries et al. | 345/147 |
| 5,204,760 | 4/1993 | Murayama et al. | 358/457 |
| 5,208,871 | 5/1993 | Eschbach | 358/457 |
| 5,229,762 | 7/1993 | Itoh et al. | 345/153 |
| 5,251,046 | 10/1993 | Kato et al. | 358/457 |

FOREIGN PATENT DOCUMENTS

| 0378780 | 7/1990 | European Pat. Off. |
| 0443510 | 8/1991 | European Pat. Off. |
| 0486090 | 5/1992 | European Pat. Off. |
| 3446880 | 7/1985 | Germany |

Primary Examiner—Richard A. Hjerpe
Assistant Examiner—Kent Chang
Attorney, Agent, or Firm—Fitzpatrick, Cella, Harper & Scinto

[57] ABSTRACT

A high quality display image is displayed on a screen by providing an; image area information generator means (203) for generating image area information for designating an area for displaying binarization image data to be obtained by image processing of image data in the multi-level frame buffer on the screen and the area for displaying binarization image data to be obtained by approximate color conversion, based on a computer software, and a processor for processing the image data based on the image area information.

8 Claims, 31 Drawing Sheets

FIG. 30A

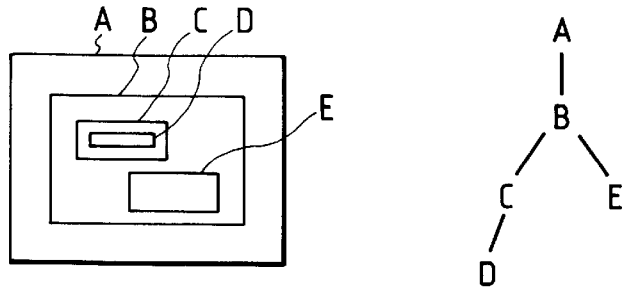

FIG. 30B

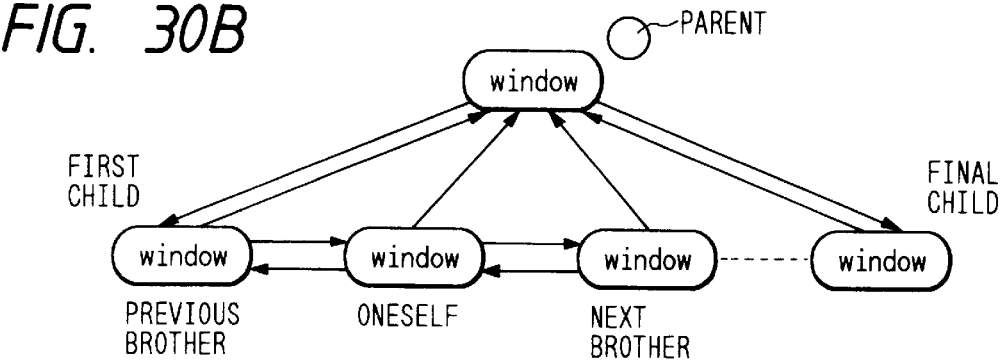

FIG. 30C

Window CONSTRUCTION MEMBER

WindowPtr   parent;
WindowPtr   nextSib;
WindowPtr   prevSib;
WindowPtr   firstChild;
WindowPtr   lastChild;

PARENT
NEXT (RIGHT) BROTHER
PREVIOUS (LEFT) BROTHER      → THERE IS POINTER FOR Window CONSTRUCTION
FIRST (MOST LEFT) CHILD         MEMBERS OF THESE WINDOWS (SEE ABOVE) AND
FINAL (MOST RIGHT) CHILD        IS PROVIDED SINGLE TREE CONSTRUCTION AS
                                A WHOLE RegionRec   clipList;

THERE IS RECTANGULAR LIST OF PORTION AT WHICH OTHER WINDOW
OVERLAPS IN ONE WINDOW

PROCESSED IMAGE

PROCESSED IMAGE

DISPLAY CONTROL METHOD AND APPARATUS

This application is a continuation of application Ser. No. 08/062,344, filed May 17, 1993, now abandoned.

BACKGROUND OF THE INVENTION

1. Field of the Invention

The present invention relates to a display control apparatus, for example, a display control apparatus for controlling a display device having display elements using a ferroelectric liquid crystal.

2. Related Background Art

Typically, in the information processing systems, display devices are used as information display means to fulfill the visual representation function of information, and CRT displays are well known as the display device.

For a CRT display device, the CRT display control independently executes the write operation by a system CPU into a video memory as display data buffer provided in the CRT and the read/display operation of data to be displayed from the video memory by, for example, a CRT controller.

In the CRT display control as mentioned above, there is an advantage that as the write operation of display data into the video memory, for example, to change display information, and the read/display operation of display data from the video memory are independently executed, the desired display data can be written at any timing without considering the display timing in a program side on the information processing system.

The read/display operation of display data from the video memory is performed in such a manner as to read display data sequentially, and send out that display data in accord with a horizontal synchronizing signal, a vertical synchronizing signal, and a blank signal to determine the display position on the CRT.

On the other hand, however, the CRT extends rearward of the display screen a certain length in a thickness direction thereof, resulting in a large volume, and making it difficult to reduce the total size of the display device. Also, the degree of freedom, such as installation place and portability, involved in the use of the information processing system applying such a CRT display may be lowered.

A liquid crystal display (hereinafter referred to as LCD) can be used to compensate for this drawback. That is, it is possible to reduce the total size (in particular the thickness) of display device by the use of this LCD. Such LCDs include a ferroelectric liquid crystal display (hereinafter referred to as FLCD: FLC display) using ferroelectric liquid crystal (hereinafter referred to as FLC: Ferroelectric Liquid Crystal) cells as mentioned previously, one feature of which resides in a liquid crystal cell preserving the display state when electric field is applied. That is, the FLCD has a sufficiently thin liquid crystal, in which slender FLC molecules are oriented in a first stable state or a second stable state in accordance with the applied direction of electric field, thereby holding the oriented state even after the electric field is removed. Owing to bistability of such FLC molecules, the FLCD has memory. The details of such FLC and FLCD have been described in, for example, U.S. Pat. No. 4,964,699.

As a result, in driving the FLCD, there occurs a float in continuous refresh drive frequency of display screen, unlike the CRT or other liquid crystal displays, and besides the continuous refresh drive, the partial rewrite drive is enabled for rewriting the display state only on a portion of display data which has been changed on the display screen.

Accordingly, if the partial rewrite drive is enabled appropriately and timely in FLCD, the FLCD obtains more advantages.

However, where the display screen is sequentially rewritten at times in accordance with the horizontal synchronizing signal, the vertical synchronizing signal, or the display data input synchronizing clock, such as in the CRT and LCD, there was no concept of sending out an address indicating the location of partial rewrite to the FLCD controller. Similarly, there was also no concept of providing the information as to the main scan address, length and rewriting at the n-th dot in the main scan line. Also, the data format in sending out data to the CRT and LCD was only provided in pixel data (multi-level information). However, in the FLCD requiring the partial rewrite, if the transmission/reception of data is performed only with pixel data, there was a problem that the representing ability (display performance) of the display device might decrease.

On the other hand, in the display using a ferroelectric liquid crystal as mentioned above, each pixel can take only two states of on and off, due to the physical reasons of liquid crystal in the state of the art. The methods of displaying halftone color with the display having such a digital property includes an area gradation method, i.e., subdividing each pixel into a plurality of sub-pixels having appropriate area ratios, each sub-pixel being covered with a color filter. According to this method, if the number of sub-pixels per pixel is n, the display is allowed to have 2 to the n-th power colors at maximum. For example, where one pixel is constituted of four sub-pixels of R (red), G (green), B (blue) and W (white), the number of possible display colors is 16.

As will be apparently recognized in the computer markets nowadays, there is a trend that display devices will be required to have higher color display ability in the future. In particular, if the application field on multi-media technology becomes popular, including pick-up of dynamic picture image, and use of complex document in combination of natural images and texts, the ability of more possible display colors is requisite. In this situation, the halftone color display with the area gradation as mentioned above has only a limited number of display colors, and is difficult to meet the requirements of application as previously described.

Thus, in order that each pixel (minimum display unit) may obtain higher color representation capability on a display having digital property (hereinafter referred to as "binary display"), a method has been devised in which image processing is introduced. This method is such that image processing such as an error diffusion is conducted to image data in a multi-level frame buffer, e.g., 8 bits/pixel, which is often used in color display, processed data being displayed on the binary display. Thereby, it is possible to attain visually higher color representation capability on the display involving only a limited number of display colors provided as a device.

However, the conventional image display devices adopting an image processing method have associated therewith the following problems. One of them is that in obtaining visually higher color representation with the image processing method, it is effective for the object image data containing an amount of halftone color such as a natural image in photograph, but for the digital image having distinct contour such as on the character output screen of the computer, and which is displayed in halftone color, the contour is likely to become rather obscure, resulting in decreased visibility of character. This is because with the conventional methods, image processing was collectively conducted over the entire screen, without considering any properties of image data.

This example is illustrated in FIG. 24. Herein, image processing was performed on the whole screen, so that an image region 56 was treated appropriately but a character region 55 was obscure on its contour. Accordingly, the quality of image degraded.

SUMMARY OF THE INVENTION

An object of the invention is to eliminate the aforementioned drawbacks.

The present invention resides in effecting excellent image display, when the level number of image data displayable on display means is smaller than the level number of input image data.

In particular, it is an object of the invention to effect appropriate processing in accordance with the features of an image to be displayed.

To accomplish such object, according to the present invention, there is disclosed an apparatus for controlling display means which is capable of displaying m-level image data for each pixel, comprising, memory means for storing image data having n-level (n>m) for each pixel, processing means for processing the image data stored in said memory means and generating processed image data having m-level for each pixel, and supplying means for supplying the processed image data generated by said processing means to the display means as display data, wherein said processing means further comprising discriminating means for discriminating characteristic of an image represented by the image data stored in said memory means and converting means for converting the image data having n-level for each pixel into the processed image data having m-level for each pixel in accordance with the discrimination result of said discriminating means.

Also, it is another object of the present invention to provide an excellent diaplay image in accordance with discrimination information of characteristic of an image from the external device.

To accomplish such object, according to the present invention, there is disclosed an apparatus for controlling display means which is capable of displaying m-level image data for each pixel, comprising, receiving means for receiving image data having n-level (n>m) for each pixel and discrimination information representing characteristic of an image represented by the image data having n-level, processing means for processing the image data having n-level for each pixel in accordance with the discrimination information and generating processed image data having m-level for each pixel, and supplying means for supplying the processed image data generated by said processing means to the display means as display data.

Also, it is another object of the present invention to provide a display controlling apparatus which can rewrite display image fast and excellently.

To accomplish such objects, according to the present invention, there is disclosed an apparatus for controlling display means which has a plurality of display elements, each element being capable of holding the display state for a predetermined period without electric charges added, comprising, receiving means for receiving image data as display data, area designation data for designating an area of display means in which the display state of display elements are to be renewed and process mode designation data for designating a process mode of processing the image data, processing means for processing the image data in accordance with the area designation data and process mode designation data and generating processed image data, and supplying means for supplying the processed image data in said area designated by said area designation data generated by said processing means to the display means as display data.

Other objects and forms of the present invention will be apparent from the following description based on the drawings and the appended claims.

BRIEF DESCRIPTION OF THE DRAWINGS

FIGS. 30A to 30C show a window management method in the X server;

DESCRIPTION OF THE PREFERRED EMBODIMENT

First embodiment

An embodiment of the present invention is set forth in that by adding one of a variety of data formats of image information and its discrimination information to an interface for passing data to a display control apparatus of a display unit capable of updating the display state of only display elements involved in alteration of display, that is, by adding pixel inherent attributes to transfer data, an appropriate binarization processing is effected within the display unit to improve the representation ability (display performance) of the display unit.

Figure 1:
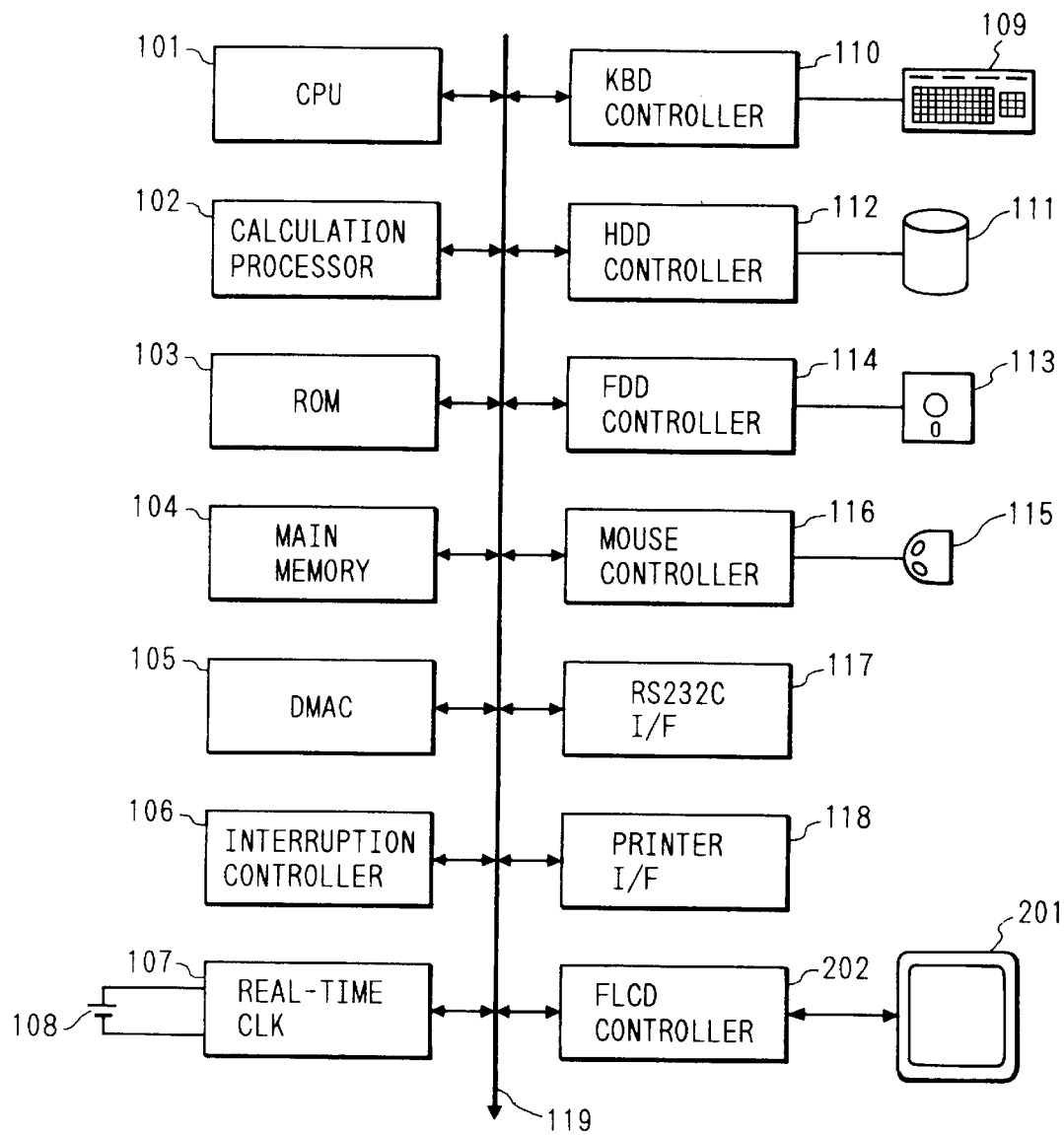
FIG. 1 is a configuration diagram of an information system apparatus illustrating totally a first embodiment of the present invention.

FIG. 1 is a block diagram of an information processing system using a display control apparatus for controlling image display means according to a first embodiment of the present invention.

In FIG. 1, 101 is a CPU for controlling an entire information processing system, 102 is a calculation processor for supporting the calculation processing of the CPU 101 at high speeds, 103 is a ROM having the basic control functions of the CPU 101 stored therein, 104 is a main memory for storing programs which the CPU 101 execute and which is useful as the work area for execution, 105 is a DMA controller (Direct Memory Access Controller, hereinafter referred to as DMAC) for transferring data between the main memory 104 and a VRAM as thereinafter described, or between the memory and various devices constituting this system, 106 is an interrupt controller for controlling hardware interrupts to be generated by various devices constituting this system, 107 is a real time clock including a calendar clock function and a C-MOS RAM for storing non-volatile information, 108 is a back-up lithium battery for operating the real time clock 17 when the power of the system is off, 109 is a keyboard for inputting character information such as various kinds of characters and control information, 110 is a keyboard controller for controlling the keyboard 109, 111 is a hard disk unit as external storage, 112 is an HDD (Hard Disk Drive) controller for performing data transfer between the hard disk unit 111 and the system and other controls, 113 is a floppy disk unit as external storage, 114 is an FDD (Floppy Disk Drive) controller for performing data transfer between the floppy disk unit 113 and the system and other controls, 115 is a mouse as a pointing device, 116 is a mouse controller for effecting signal connection between the mouse 115 and the system, 117 is an RS232C interface for connecting to an external input/output device having RS232C type interface, 118 is a printer interface for connecting to an external printer or other external devices, 201 is an FLC display unit (hereinafter referred to as FLCD) having a display screen made of a ferroelectric liquid crystal as display medium, 202 is an FLCD controller having image display means according to one embodiment of the present invention, and 119 is a system bus consisting of a data bus, a controller bus and an address bus for effecting signal connection between each device as mentioned above.

Figure 2:
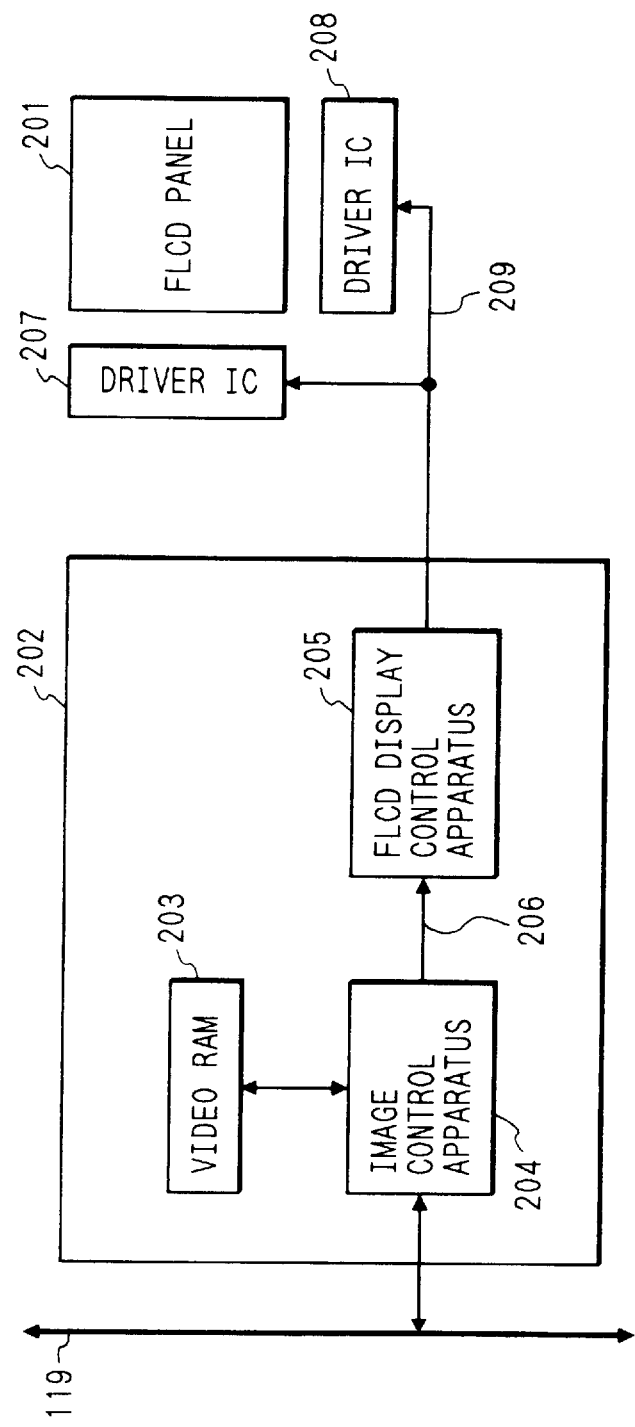
FIG. 2 is a configuration diagram of an FLCD controller according to the embodiment of the present invention.

FIG. 2 shows in detail the inside of the FLCD controller 202 as shown in FIG. 1.

In FIG. 2, 203 is a video RAM for storing image information, 204 is an image control apparatus for controlling the video RAM 203 and the access from the system bus 119, 205 is an FLCD display control apparatus for controlling the display of an FLCD panel 201 by processing data from the image control apparatus, 206 is a display control apparatus bus for effecting connection between the image control apparatus 204 and the FLCD display control apparatus 205, which passes data including discrimination flag, display data and address information, 207, 208 are driver ICs for driving the FLCD panel 201, and 209 is a signal line for sending out display data from the FLCD display control apparatus 205 to the FLCD.

Figure 3:
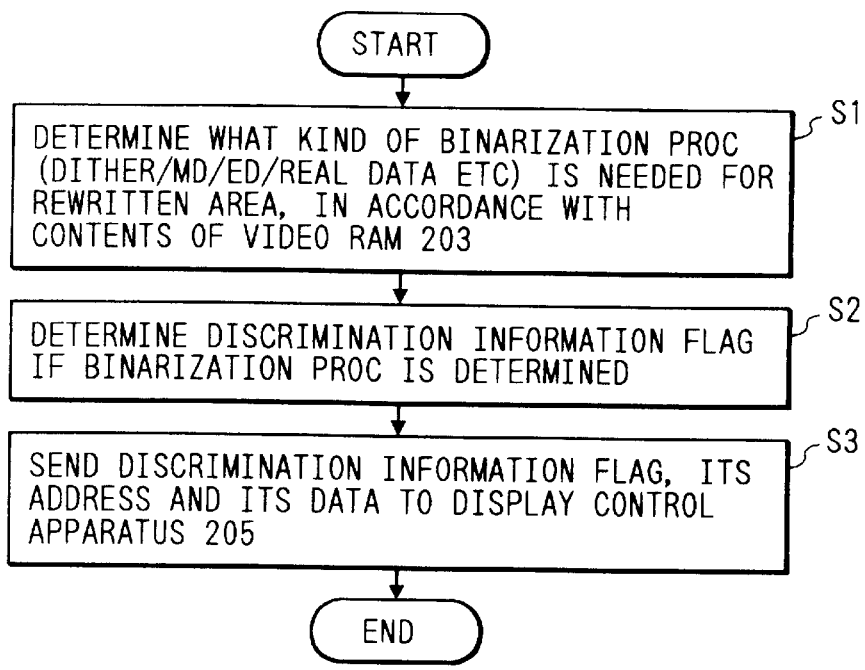
FIG. 3 is a flowchart of an image control apparatus according to the embodiment of the present invention.

FIG. 3 is a flowchart of the processing with the image control apparatus 204.

At step S1, the kind of binarization processing (dither/MD/ED/through) needed for the rewritten area, is determined in accordance with the contents of video RAM 203.

At step S2, a discrimination information flag indicating binarization processing determined at step S1 is set.

At step S3, a discrimination information flag, its display data and address information are sent out to the display control apparatus 205.

In this embodiment, the discrimination information flag, display data and address information are sent out in parallel via the different transmission lines.

Figure 4:
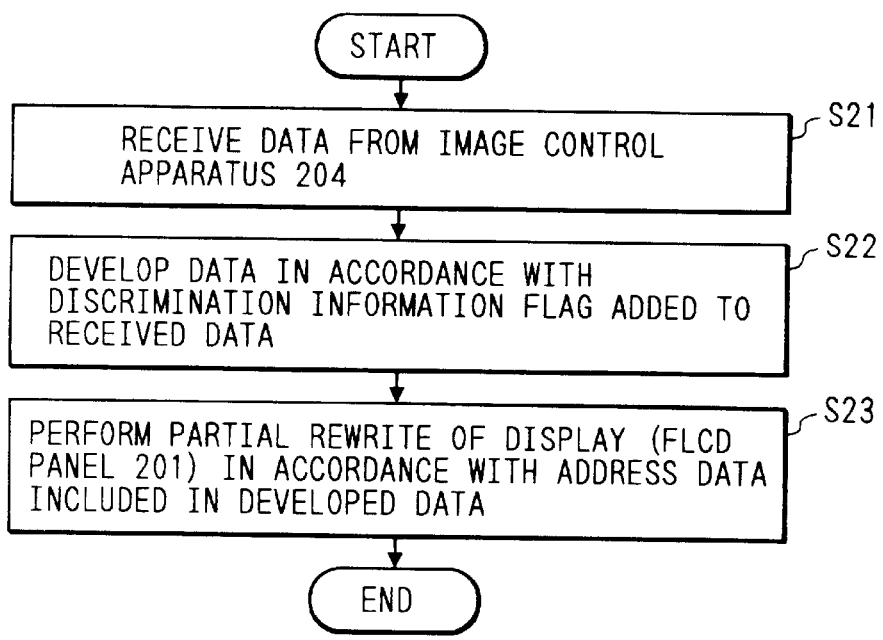
FIG. 4 is a flowchart of an FLCD display control apparatus according to the embodiment of the present invention.

FIG. 4 shows a flowchart of the processing with the FLCD display control apparatus 205.

At step S21, data from the image control apparatus 204 is received.

At step S22, data is developed in accordance with the discrimination information flag added to received data.

At step S23, the partial rewrite of FLCD panel 201 is performed by driving the driver ICs 207, 208 in accordance with the address data included in developed data.

The CPU 101 makes it possible to gain access to the FLCD controller 202 via the system bus 119. Also, other bus masters such as DMAC 105 can gain access to the FLCD controller 202.

In FIG. 2, access to the video RAM 203 can be made from the system bus 119 via the image control apparatus 204. In the video RAM 203 is stored display data on the FLCD panel 201. When the data stored in the video RAM 203 is rewritten from the system bus 119 via the image control apparatus 204, the image control apparatus 204 operates in accordance with a flowchart as shown in FIG. 3. Data input into the FLCD display control apparatus 205 via a bus of the display control apparatus is processed by the FLCD display control apparatus 205 in accordance with a flowchart as shown in FIG. 4, and displayed by rewriting the FLCD panel 201 via the signal line 209 and the driver ICs 207, 208.

Figure 5:
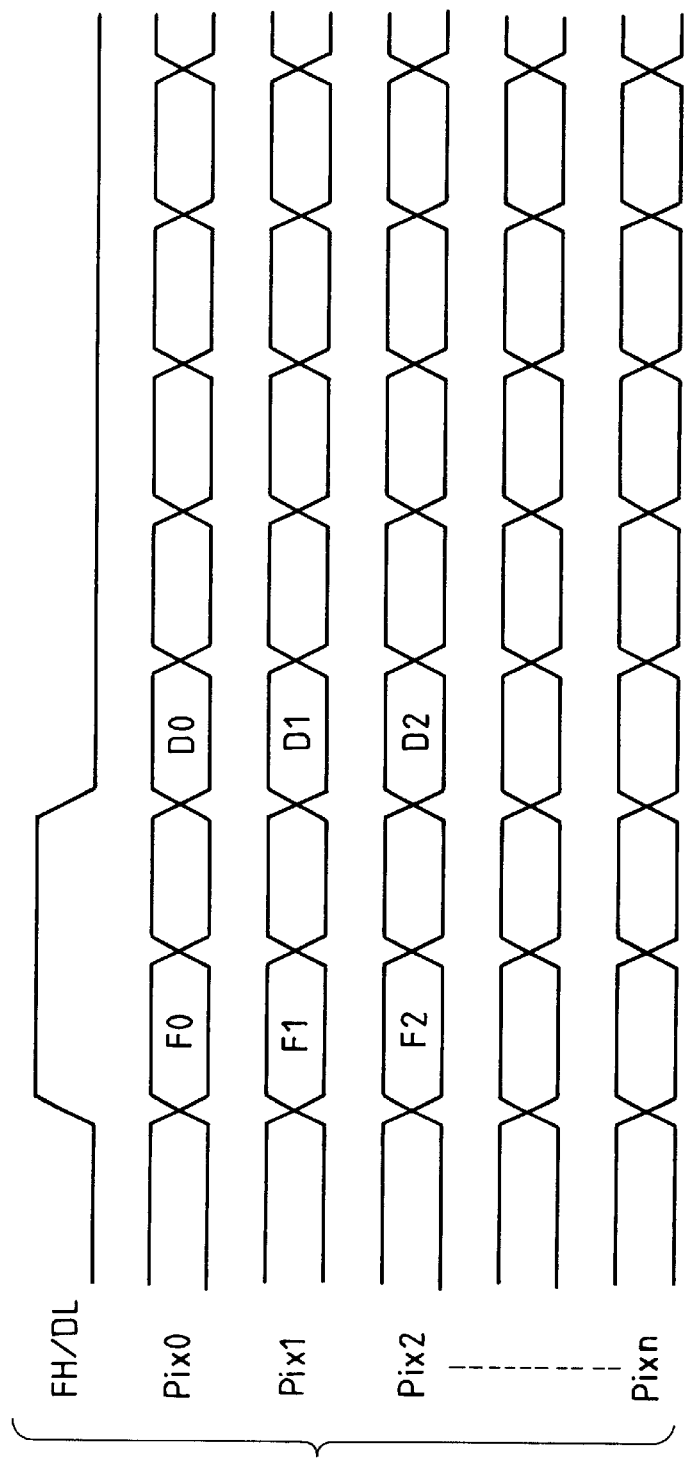
FIG. 5 shows a signal format of bus interface according to the embodiment of the present invention.
Figure 6:
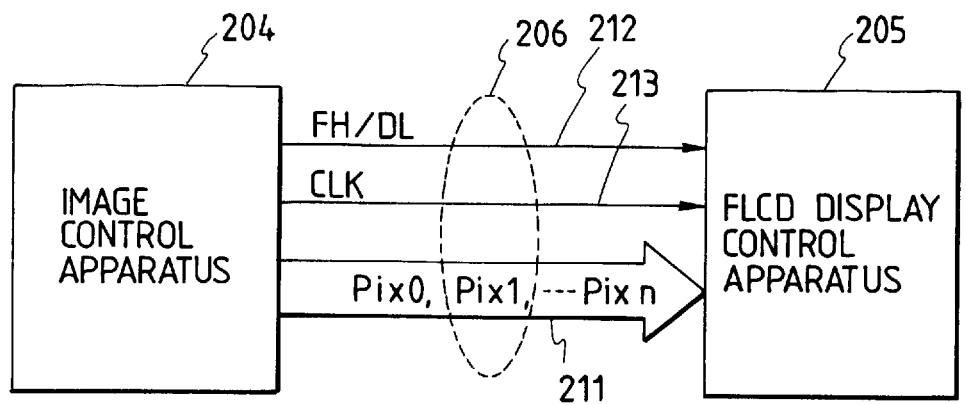
FIG. 6 shows a bus signal line of a display control apparatus according to the embodiment of the present invention.

FIG. 5 shows an example of signal format in a bus 206 of the display control apparatus. FIG. 6 shows the signal line of the bus 206 in the display control apparatus, wherein 211 is signal data line for Pix0, Pix1, Pix2, . . . Pixn, and 212 is FH/DL signal line, indicating whether the contents on the data line of Pix0, Pix1, . . . Pixn are data format or pixel data. 213 is a clock line for effecting synchronization of the data line.

In FIG. 6, if the image control apparatus 204 detects that the video RAM 203 has been rewritten, preparing for each data in accordance with the flowchart as shown in FIG. 3, it outputs High as the FH/DL signal 212, and outputs data format signal from Pix0, Pix1, . . . Pixn in synchronism with the clock line 213. This data format signal contains therein a main scan address, the length, a discrimination information flag, and a negative/positive inversion flag.

In the data format as shown in FIG. 5, data is passed from the image control apparatus 204 to the FLCD display control apparatus 205, which processes data in accordance with the flowchart as shown in FIG. 4 and displays the data on the FLCD panel 201 via the driver ICs 207, 208.

Figure 7:
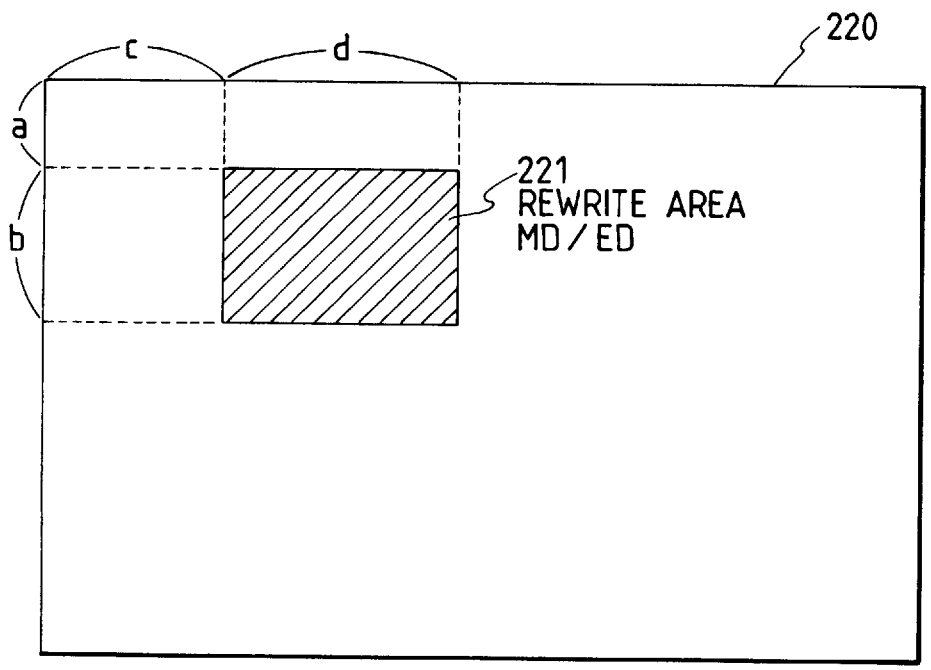
FIG. 7 shows an FLCD screen according to the embodiment of the present invention.

FIG. 7 shows a rewrite area on a screen of the FLCD panel 201, wherein 220 is an FLCD screen and 221 is the rewrite area, and wherein a, b, c, d as indicated in the figure are address information specifying the rewrite area, the data of a, b, c, d being received via the bus 206 of the display control apparatus by the FLCD display control apparatus 205 to rewrite the rewrite area 221. For each rewrite area, a discrimination information flag indicating the binarization processing being performed is held in the FLCD display control apparatus 205.

Figure 12:
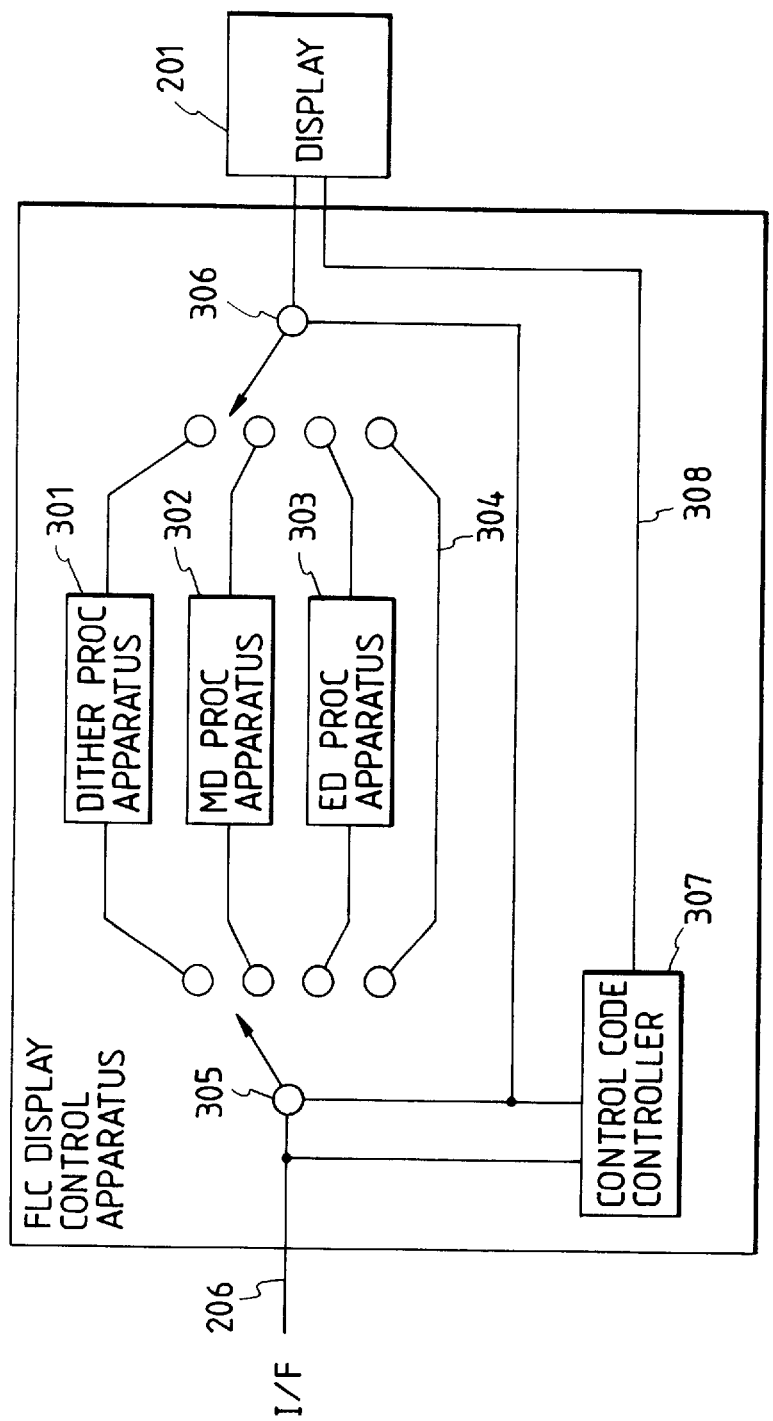
FIG. 12 is a block diagram of an FLC display control apparatus.

FIG. 12 shows in detail the inside of the FLCD display control apparatus 205. 301 is a dither processing device for performing dither processing, 302 is an MD (average density reserve method) processing device for performing binarization processing as described in U.S. Pat. No. 5,018,024, 303 is an ED (error diffusion method) processing device for performing error diffusion processing, 304a through output device, 305, 306 are switching devices, and 307 is a control code controller. 308 is a rewrite address line.

The control code controller 307 sets the witching devices 305, 306 in accordance with the discrimination information flag, and determines the way in which binarization processing is performed.

Figure 13:
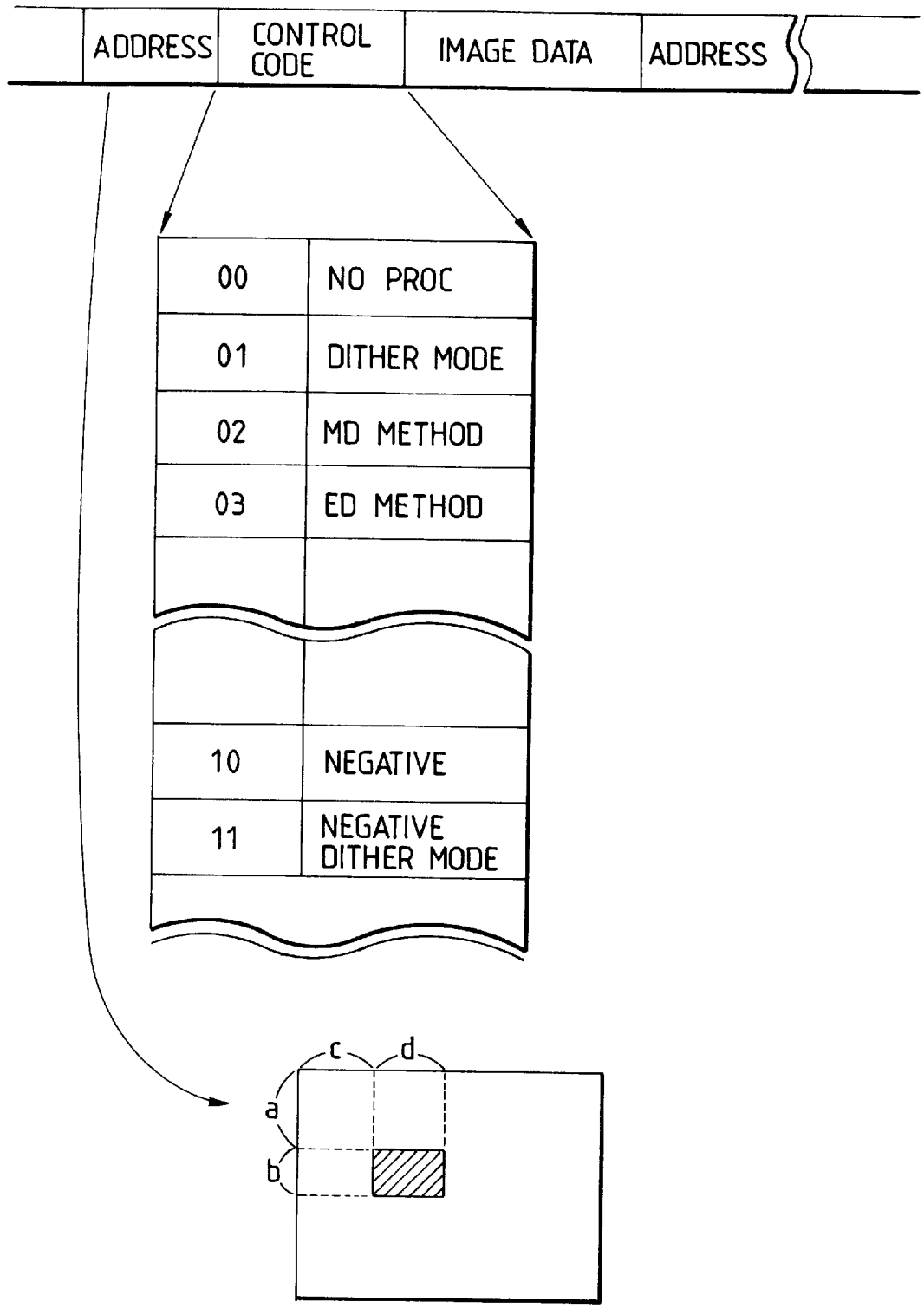
FIG. 13 is a diagram showing the bus data format.

FIG. 13 shows the data format of the bus for the display control apparatus. Address area contains address information of a, b, c, d. Control code contains a discrimination information flag indicating the way in which binarization processing is performed.

<Variation>

Figure 8:
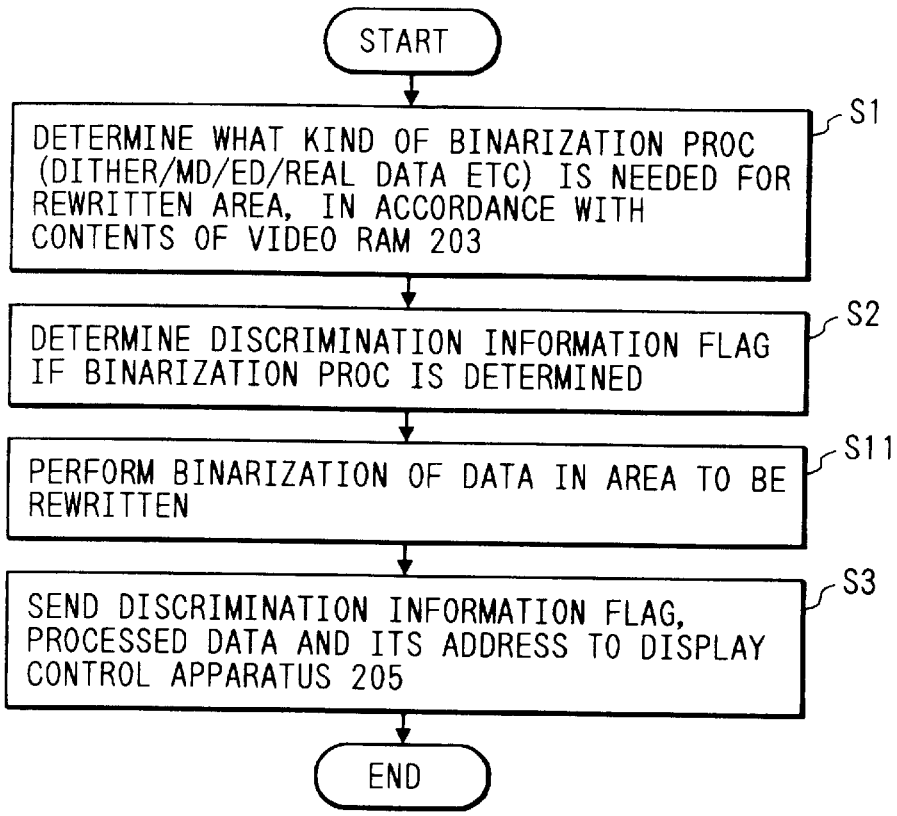
FIG. 8 is a flowchart no. 2 of an image control apparatus according to the embodiment of the present invention.
Figure 9:
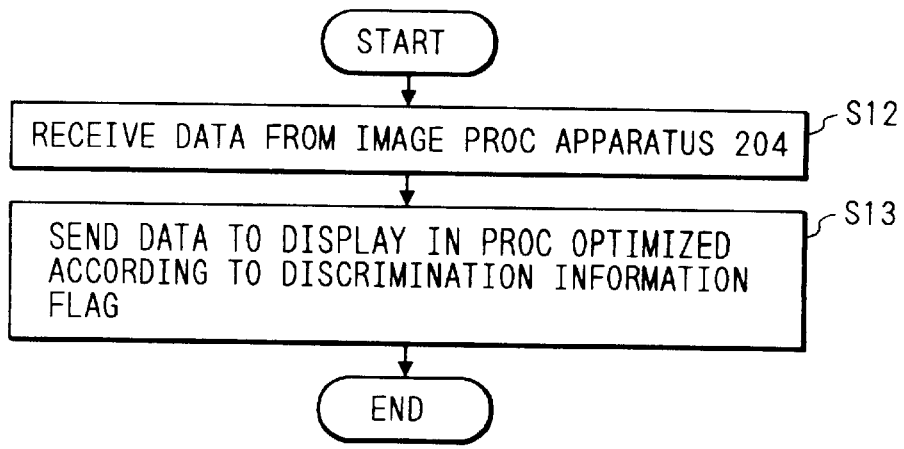
FIG. 9 is a flowchart no. 2 of an FLCD display control apparatus according to the embodiment of the present invention.

In place of the flowcharts as shown in FIGS. 3 and 4, the processing as shown in FIGS. 8 and 9 may be performed.

That is, as shown at step S11, binarization of data is performed on the side of image control apparatus 204, and the data is passed to the FLCD display control apparatus 205. In this case, as there is no need of performing binarization on the FLCD display control apparatus, its load is relieved.

Figure 10:
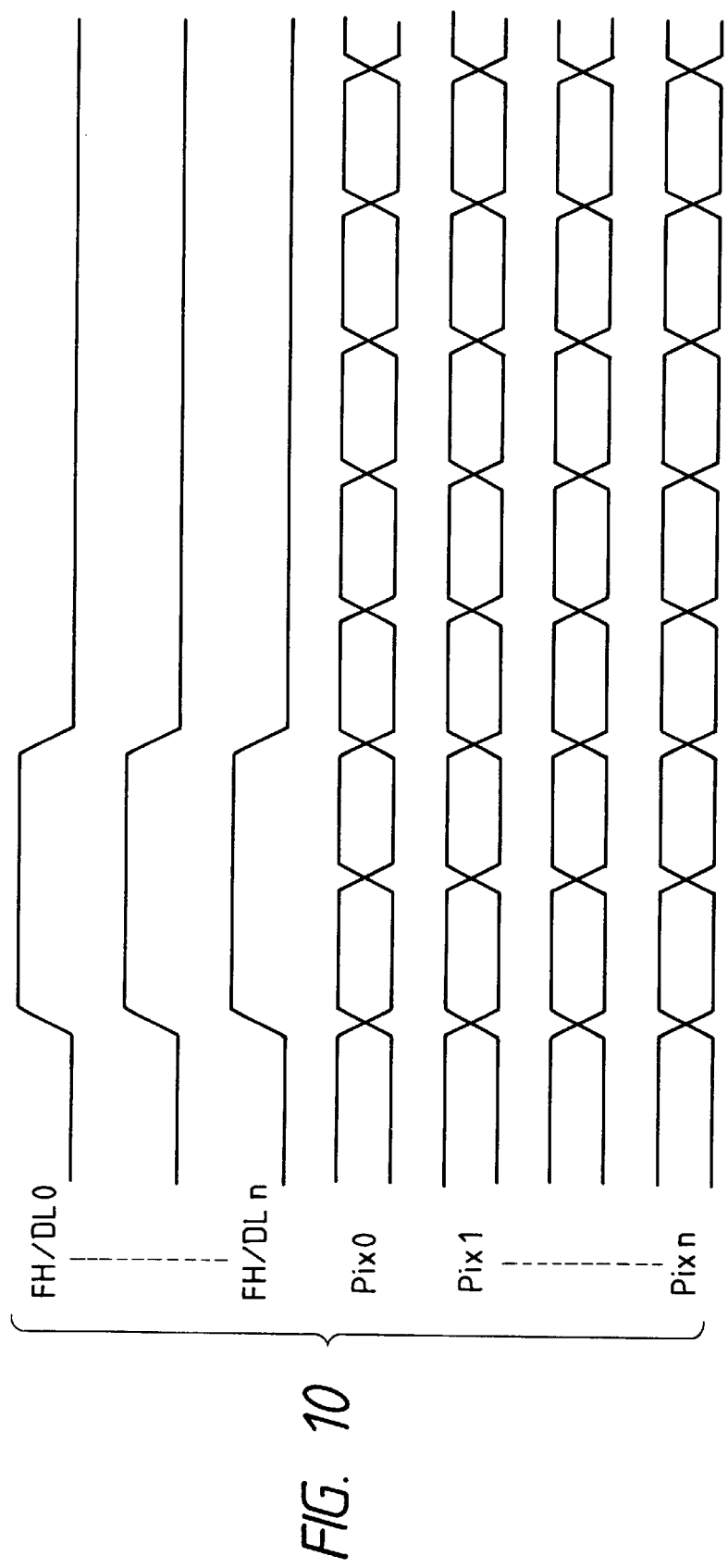
FIG. 10 shows a signal format no. 2 of bus interface according to the embodiment of the present invention.
Figure 11:
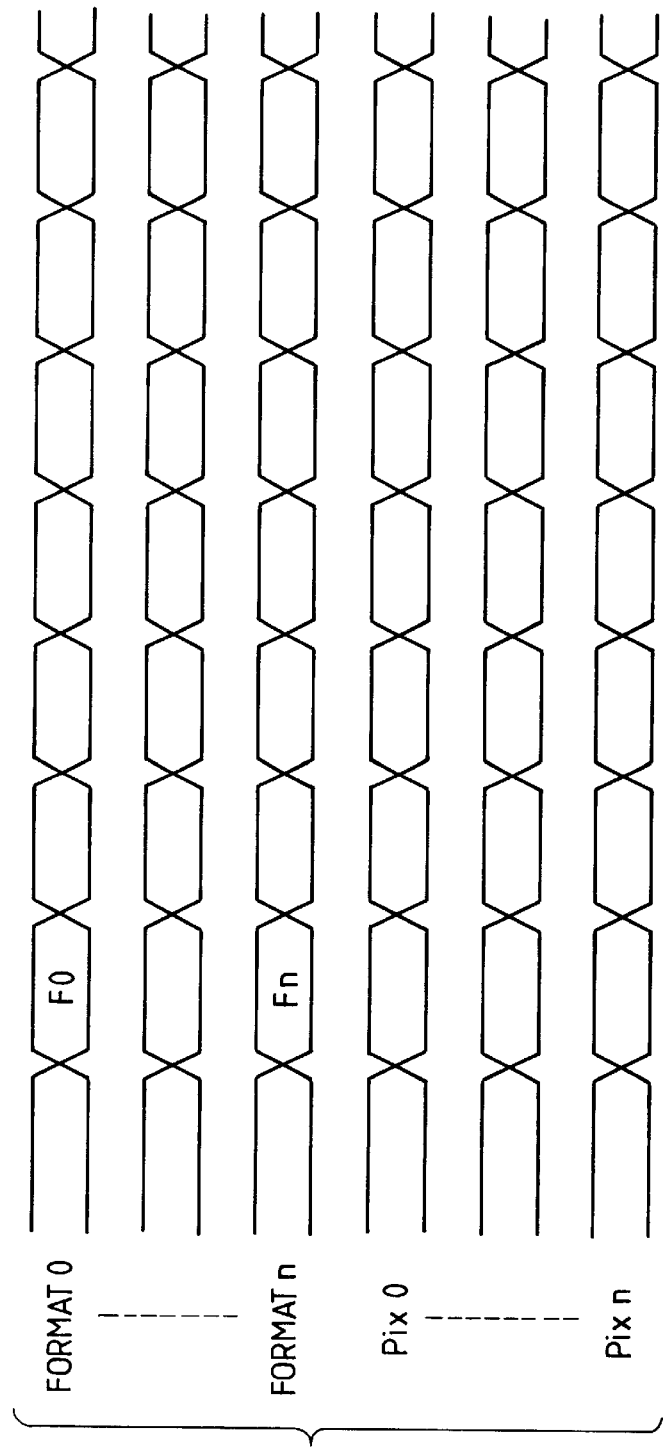
FIG. 11 shows a signal format no. 3 of bus interface according to the embodiment of the present invention.

In place of the data format as shown in FIG. 5, a data format as shown in FIG. 10 may be used. Thereby, it is possible to deal with a greater amount of binarization processing request discrimination information with a plurality of FH/DL signals. Also, in place of the data format as shown in FIG. 5, a data format as shown in FIG. 11 may be used. As shown in FIG. 11, by using different signal lines for binarization processing request discrimination information and pixel data, the processing efficiency of the FLCD control apparatus 205 can be further improved.

It should be noted that the display device as mentioned above is not limited to an FLCD, but may be any one of other display devices, in particular, a rewritable display device.

Also, it should be noted that the binarization processing is not limited to a dither method, an error diffusion method (ED), and an average density reserve method (MD), but may be an average density approximate method.

As described above, the improvement in representation ability (display performance) of the FLCD can be accomplished in that the pixel inherent attributes are added to transfer data to be displayed on the FLCD, data format is generated in which the binarization of image portion is selectable in accordance with the discrimination information, with the character portion creating character codes, and the decomposition area address of character portion/image portion is transferred definitely.

Thus, according to the present invention, it is possible to exploit fully the representation ability of the display apparatus.

Second embodiment

Figure 14:
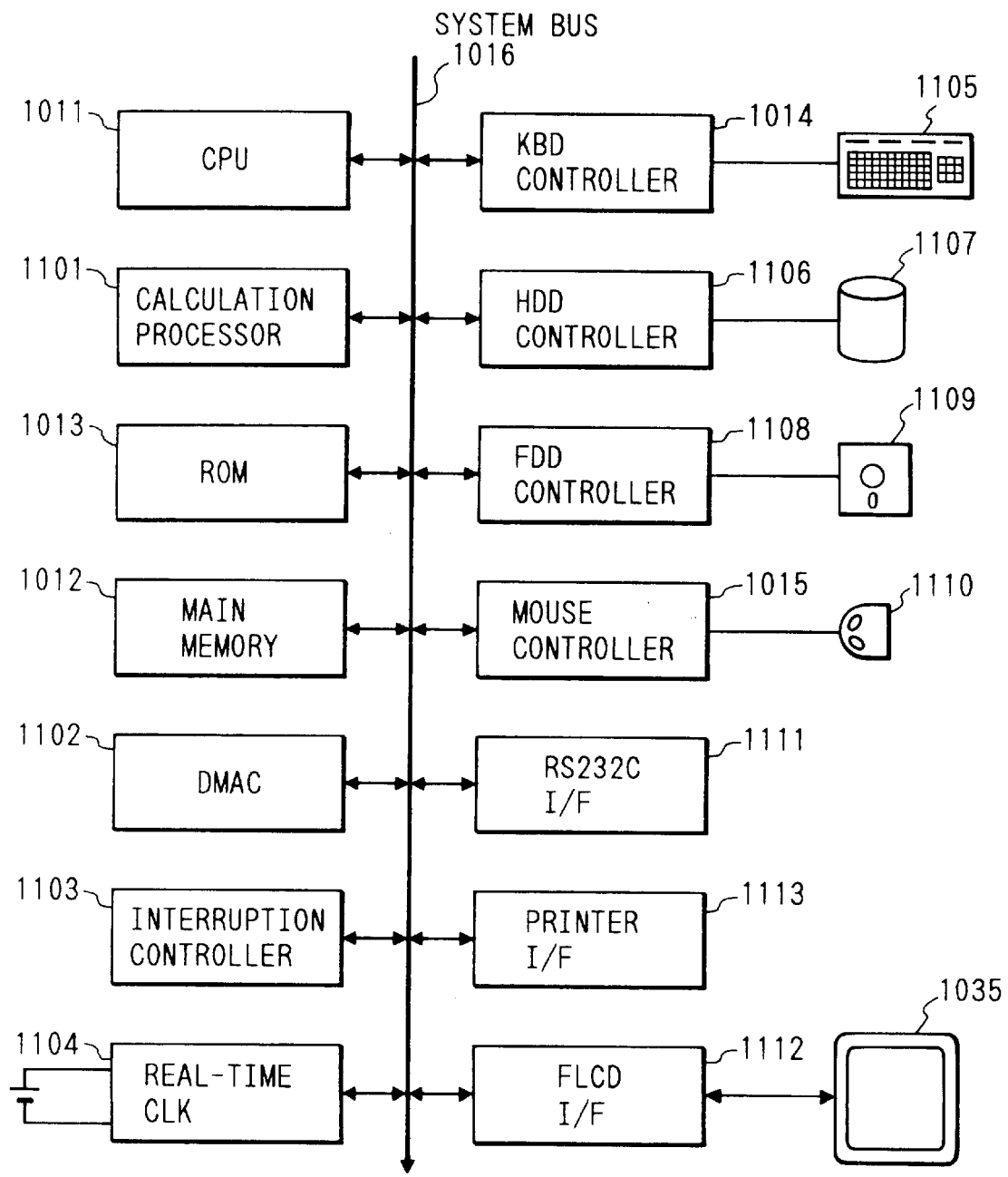
FIG. 14 is a block diagram of an information processing device according to a second embodiment of the present invention.

FIG. 14 is a block diagram of an information processing system using an FLC (ferroelectric liquid crystal) display device with a display control apparatus according to a second embodiment of the present invention, with the display device useful for a variety of character and image information.

1011 is a CPU for controlling the whole information processing system, 1012 is a main memory for storing programs which the CPU 101 execute and which is useful as the work area for execution, 1013 is a ROM in which a start program at the power-on and the fonts are stored, 1014 is a keyboard controller for inputting various characters, 1105 is a keyboard connecting to the keyboard controller 1014, 1110 is a mouse as the pointing device, 1015 is a mouse controller for controlling the mouse 1110, 1016 is a system bus consisting of an address bus, a data bus and a control bus, 1101 is a calculation processor for performing calculation of the CPU 1011 at higher speeds, 1102 is a DMA controller (hereinafter referred to as DMAC) for transferring data between the main memory 1012 and various devices constituting this system, without intervention of the CPU 1011, 1103 is an interrupt controller for processing an interrupt signal from various devices constituting this system, 1104 is a real time clock, battery backed up, for indicating the current time, 1107 and 1109 are a hard disk unit and a floppy disk unit, respectively, for use as the external storage, 1106 is a hard disk drive (hereinafter abbreviated as HDD) for controlling the hard disk unit 1107, 1108 is a floppy disk drive (hereinafter abbreviated as FDD) controller for controlling the floppy disk unit 1109, 1111 is an RS232C interface for effecting communication on the RS232C standard which is a kind of serial data transmission, 1113 is a printer interface for signal connection between the printer and this system, and 1035 is a ferroelectric liquid crystal device (hereinafter abbreviated as FLCD) as the display device, which requires the address and the display data in displaying. 1112 is an FLCD controller for controlling the FLCD 1035 to make a display.

Figure 15:
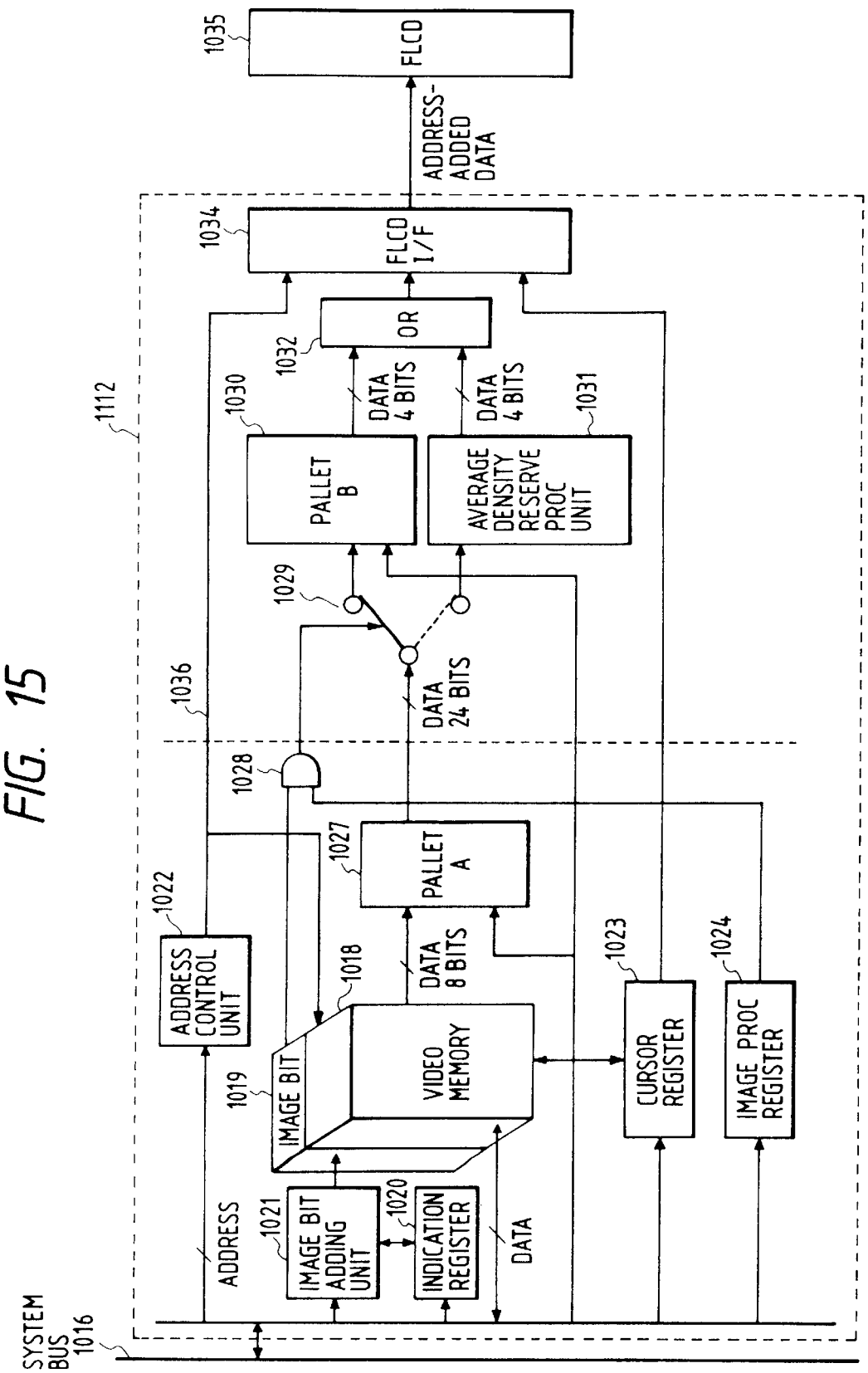
FIG. 15 is a block diagram of an FLCD controller according to the second embodiment of the present invention, wherein an average density reserve processing is applied and a switch is provided prior to image processing.

FIG. 15 is a block diagram showing the details of the FLCD controller 112.

1018 is a video memory in the bit map format in which one pixel corresponds to one byte of display data in the display device, data output to the display device being 8 bits in total for the RGB components of red, green and blue, 1019 is an image bit, one byte per pixel, for specifying at the same address as in the video memory 1018 0 if one pixel of display data in the display device is character, or 1 if it is image, 1020 is an indication register for indicating the value of the image bit 1019, i.e., either 0 or 1, from the CPU 1011 via the system bus 1016, 1021 is an image bit adding unit for reflecting the value of the indication register 1020 to the image bit at the same address as in the video memory 1018, in writing into the video memory 1018, 1022 is an address control unit for generating the address necessary for the video memory 1018 and FLCD-I/F1034 (thereinafter described) by decoding the address information from the system bus 1016, 1023 is a cursor register for writing the positional information of mouse controller 1015 and the shape information from the CPU 1011, via the system bus, as the cursor data, and 1024 is an image processing register for causing the CPU 1011 to write 0 when halftone image processing is compulsorily prohibited, or 1 when halftone image processing is performed. This is a mode provided to compulsorily prohibit the image processing because already halftone data has been input into the video memory 1018, and it is no longer necessary to perform halftone image processing. 1028 is an AND circuit for ANDing the image bit 1019 and the image processing register 1024, 1027 is a pallet A for converting the data of e.g., 8 bits per pixel to be output from the video memory 1018 to the display device, into the data of 24 bits in total for the RGB components, by a display driver software not dependent upon the display device from the CPU 1011, 1029 is a switch for switching the data from the pallet A 1027 into a pallet B 1030 (thereinafter described) if the output from the AND circuit 1028 is 0, or an average density reserve processing unit 1031 (thereinafter described) if it is 1, 1030 is the pallet B for converting 16-bit display data from the pallet A 1027 into 4-bit data corresponding to the FLCD as the display device of this embodiment, upon an instruction from the CPU 1011, for example, 4-bit data in which one pixel consists of four bits in total, one bit for each of R (red), G (green), B (blue), and I (white). 1031 is an average density reserve processing unit, which is a kind of image processing device, for applying the average density reserve processing to 16-bit display data from the pallet A for the conversion into 4-bit data corresponding to the FLCD which is a display device of this embodiment, 1032 is an OR circuit for ORing the results from the pallet B 1030 and the average density reserve processing 1031, and 1034 is an FLCD interface (hereinafter abbreviated as I/F) for creating address-added data by superimposing the cursor data from the cursor register 1023 on the display data from the switch 1032 for the output to the display device as the final data, and further adding the address from the address control unit 1022 thereto.

Two ways of dividing the information system when the FLC unit containing FLCD 1035 is assembled in a housing separately provided from a main device of the information system are provided such as (1) Between FLCD-I/F 1034 and FLCD 1035
(2) At boundary 1036 in FIG. 14

That is, the FLCD-I/F 1034 and the FLCD 1035 may be provided separately, or a portion to the right from the boundary 1036 together with the FLCD-I/F 1034 in FIG. 15 may be contained in the FLCD 1035.

The operation will be described below with reference to a flowchart of FIG. 16.

At step S61, color conversion data by a display driver software not dependent upon the display device is written into the pallet A, and color conversion data dependent upon the FLCD display device is written into the pallet B.

At step S62, the image processing register 1024 is set at "1" when the average density reserve processing which is a method for halftone image processing is executed, or "0" when this processing is compulsorily prohibited.

At step S63, the indication register 1020 is set at "1" when data group of video memory 1018 to be written is image, or "0" when data group is character. Such settings are performed by the computer connected on the system bus 1016.

At step S64, at the same time when data is written from the CPU 1011 into the video memory 1018, he image bit adding unit 1021 writes one-bit information of the indication register 1020 into the image bit 1019.

At step S65, when display data onto the FLCD 1035 is called from the video memory 1018, the value of image bit 1019 indicating whether the image is at the same address as in the video memory and the value of image processing register are ANDed. If the result is "1", that is, the display data is image and the image processing is conducted, the procedure goes to step S66, or if the result is "0", that is, the display data is character and the image processing is not conducted, the procedure goes to step S67.

At step S66, 8-bit display data from the video memory 1018 is passed via the pallet A 1027 to generate 16-bit data specified at step S61, and further passed via the average density reserve processing 1031 to generate 4-bit data corresponding to the FLCD 1035.

At step S67, 8-bit display data from the video memory 1018 is passed via the pallet A 1027 to generate 16-bit data specified at step S61, and further passed via the pallet B 1030 to generate 4-bit data corresponding to the FLCD 1035.

At step S68, the logic OR of 4-bit data for the average density reserve processing 1031 and the pallet B 1030 is taken in the OR circuit 1032.

At step S69, display data from the OR circuit and cursor data of the cursor resister 1023 are synthesized by the FLCD I/F 1034, and the address from address control unit 1022 is added thereto to obtain address-added data to be sent to FLCD 1035.

While in the above embodiment the data on the display side of video memory is 8 bits wide, the output data is 16 bits wide, and the output data from each of the pallet B 1030 and the average density reserve processing 1031 is 4 bits wide, it should be noted that the data width can take any appropriate value.

Since the display driver software can discriminate whether the display data is image or character, and transfers data with its indication added thereto, it is possible to easily discriminate the type of display data.

The average density reserve method, which allows for arbitrary selection of the threshold value for determining the gradation threshold, has the advantage of providing for clear image at high resolution even if the image has less density.

<Variation 1>

Figure 17:
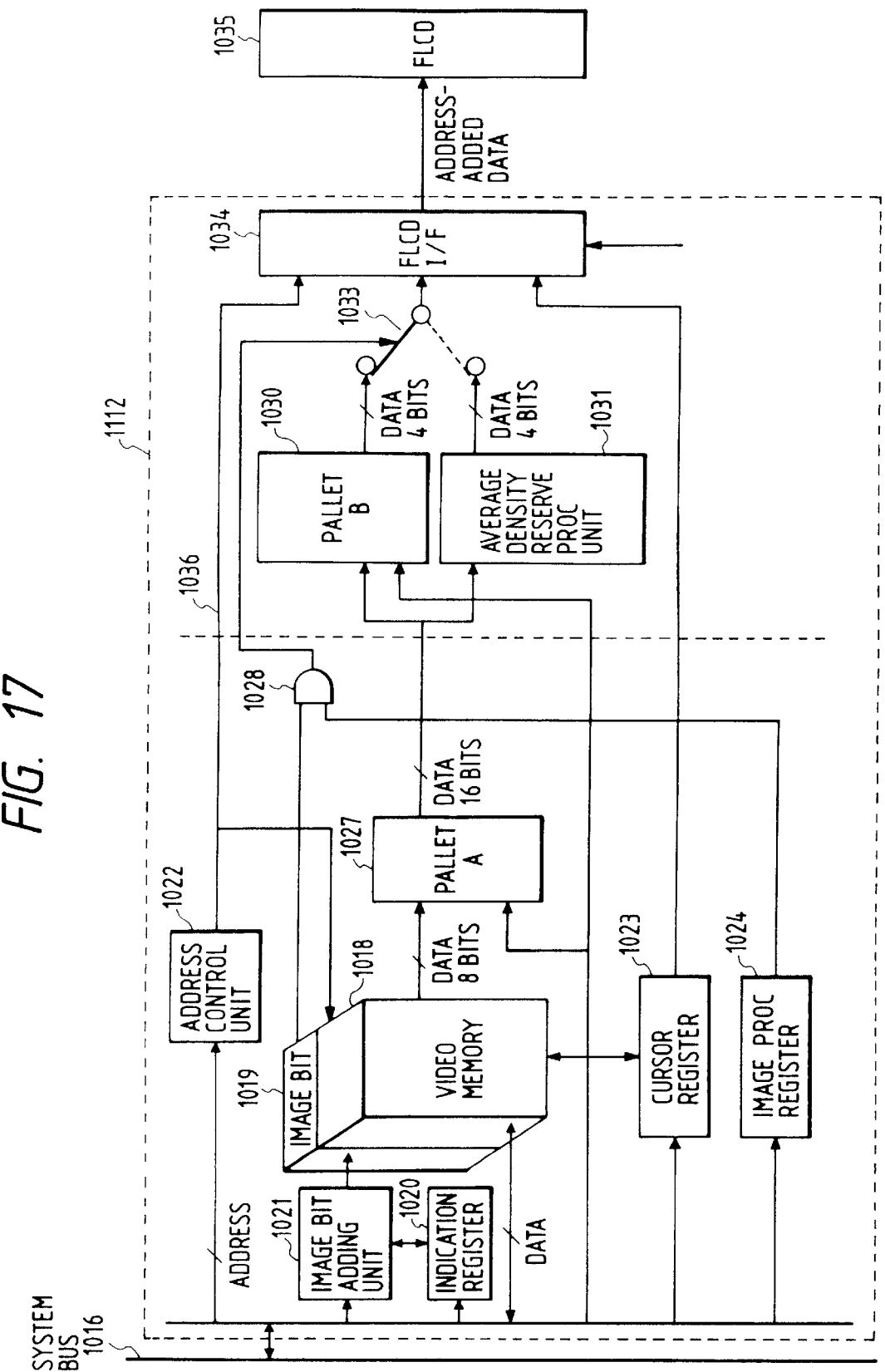
FIG. 17 is a block diagram of an FLCD controller according to a variation 1 of the present invention, wherein an average density reserve processing is applied and a switch is provided after image processing.

FIG. 17 is a block diagram of an FLCD controller according to another embodiment 2of the invention, which will be described below.

The configuration of the parts from the video memory 1018 to the AND circuit 1028 is the same as that of FIG. 15, the explanation thereof being omitted. 1030 is a pallet B for converting 16-bit display data from the pallet A 1027 into 4-bit data corresponding to the FLCD which is a display device of the invention, upon an instruction from the CPU 1011, 1031 is an average density reserve processing (a kind of image processing) unit for converting 16-bit display data from the pallet A 1027 into 4-bit data corresponding to the FLCD which is a display device of the invention by applying an average density reserve processing, 1033 is a switch for selecting 4-bit data of the pallet B 1030 if the output of the AND circuit 1028 is 0, or 4-bit data of the average density reserve processing 1031 if it is 1, 1034 is an FLCD-I/F for creating the address-added data transferred to the FLCD 1035 (thereinafter described) by superimposing the cursor data from the cursor register 1023 on the display data from the switch 1032 for the output to the display device as the final data, and further adding the address from the address control unit 1022, and 1035 is a ferroelectric liquid crystal device.

Figure 18:
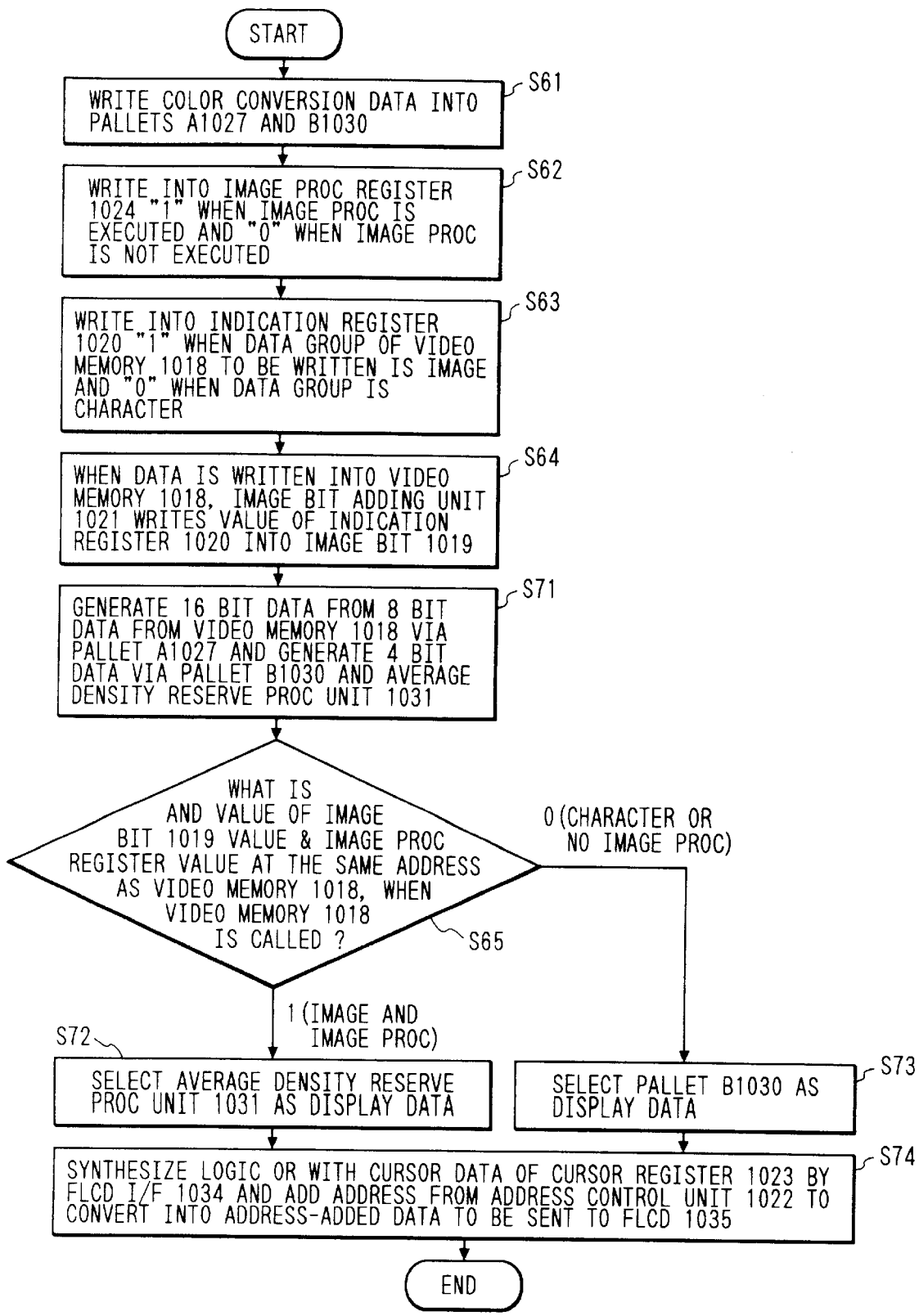
FIG. 18 is a flowchart of an FLCD controller according to the variation 1 of the present invention, wherein an average density reserve processing is applied and a switch is provided after image processing.

The operation will be described below with reference to a flowchart of FIG. 18.

Figure 16:
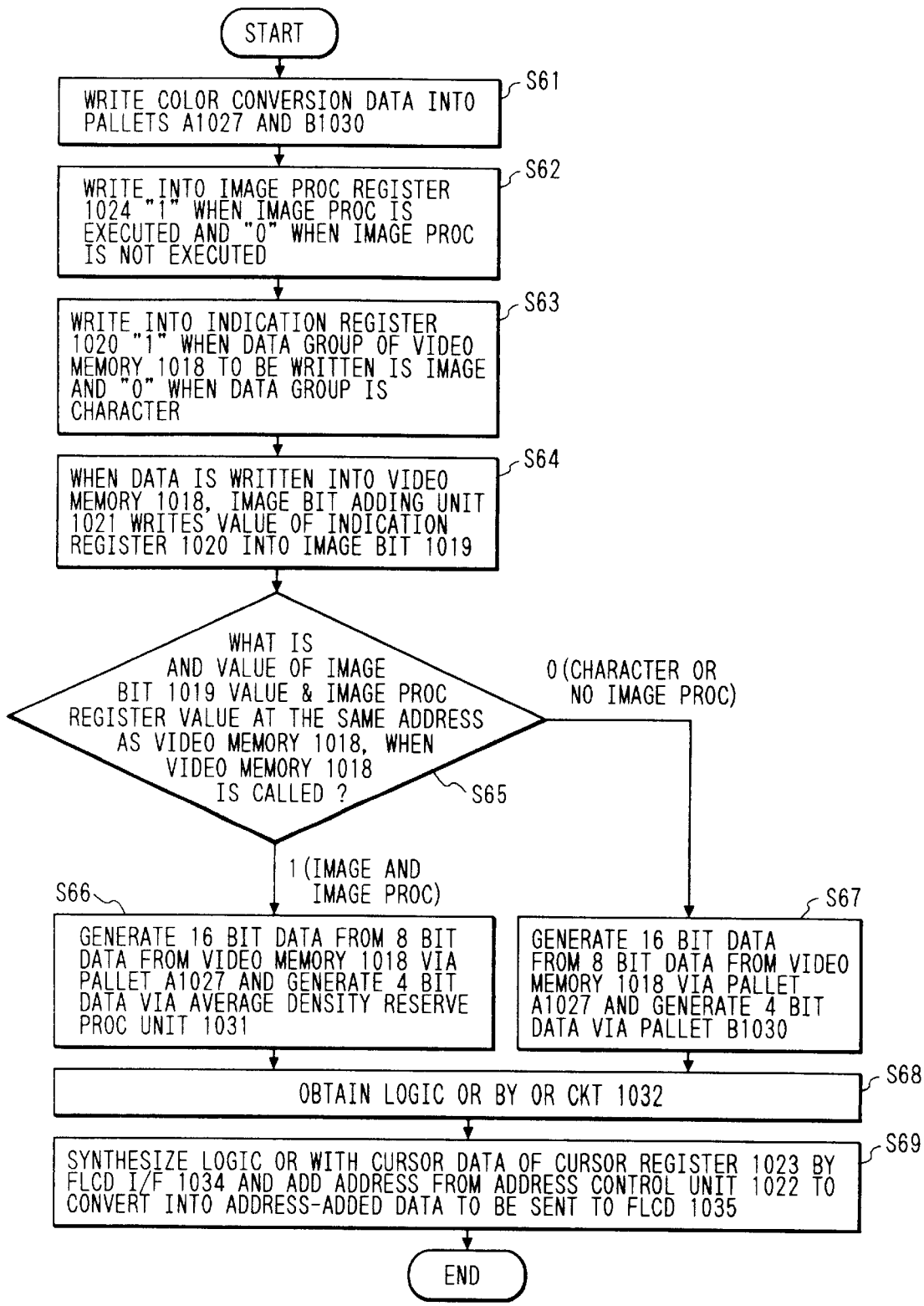
FIG. 16 is a flowchart of an FLCD controller according to the second embodiment of the present invention, wherein an average density reserve processing is applied and a switch is provided prior to image processing.

The processings from step S61 to S64 are the same as those of FIG. 16, the explanation thereof being omitted.

At step S71, 8-bit display data from the video memory 1018 is passed via the pallet A 1027 to generate 16-bit data specified at step S61, and further passed via the pallet B 1030 and the average density reserve processing 1031 to generate 4-bit data corresponding to the FLCD 1035.

At step S65, when display data to the FLCD 1035 is called from the video memory 1018, the value of image bit 1019 indicating whether the image is at the same address as in the video memory and the value of the image processing register are ANDed. If the result is "1", that is, the display data is image and the image processing is conducted, the procedure goes to step S72, or if the result is "0", that is, the display data is character and the image processing is not conducted, the procedure goes to step S73.

At step S72, the data subjected to the average density reserve processing is selected as display data.

At step S73, the data subjected to color conversion specified in the pallet B is selected as display data.

At step S74, display data from the switch 1033 and cursor data of the cursor resister 1023 are synthesized by the FLCD I/F 1034, and the address from the address control unit 1022 is added thereto to obtain address-added data to be sent to the FLCD 1035.

Since according to this embodiment the pallet B 1030 and the average density reserve processing unit 1031 operate in parallel to select either of the outputs therefrom for each pixel, unnatural gap is prevented from occurring particularly at the boundary regions.

<Variation 2>

Figure 19:
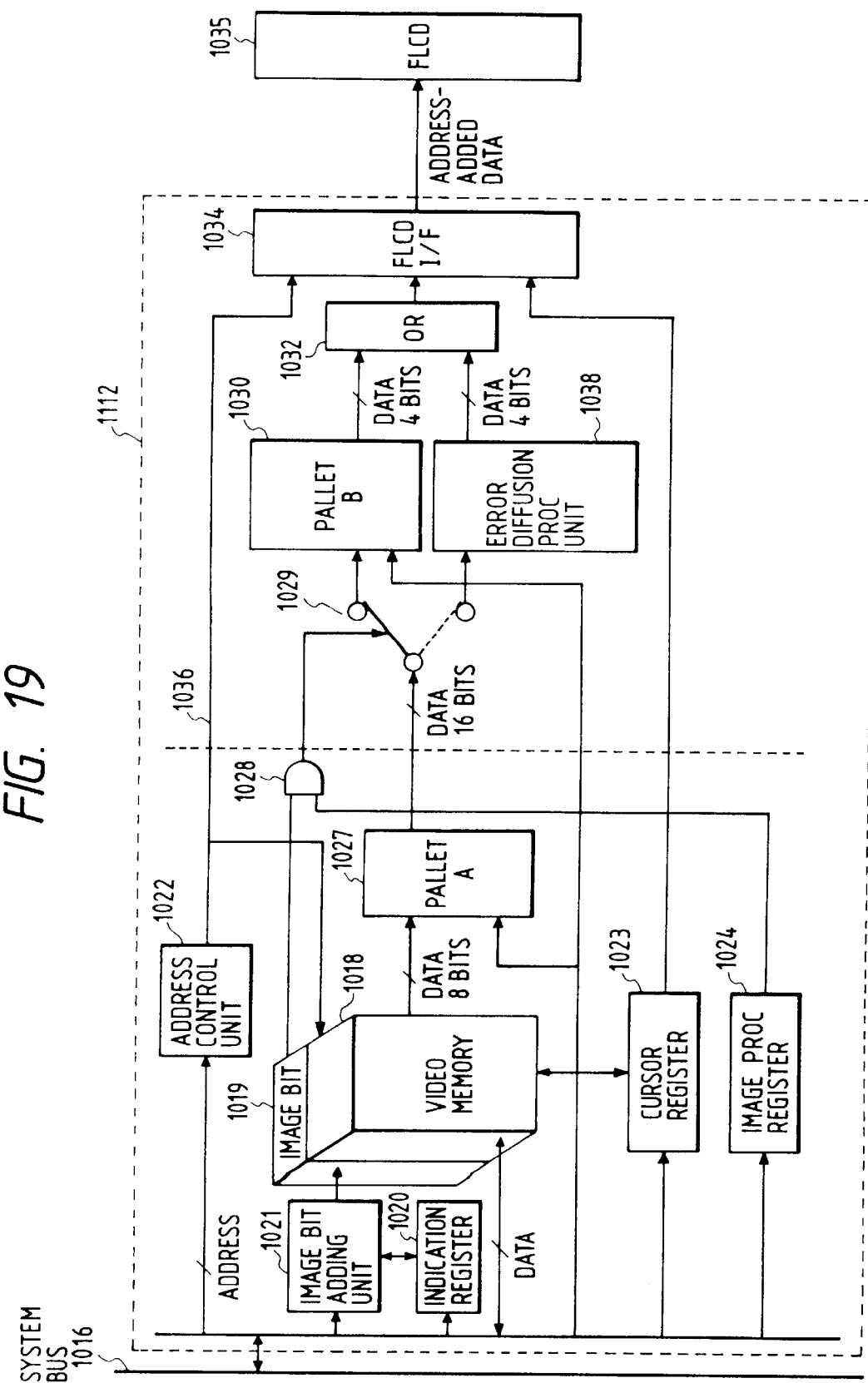
FIG. 19 is a block diagram of an FLCD controller according to a variation 2, wherein an error diffusion processing is applied.

FIG. 19 is a block diagram of an FLCD controller according to another embodiment 2, which will be described below.

This variation is set forth in that the average density reserve processing 1031 which is one of the image processings in the second embodiment is replaced with an error diffusion processing 1038, whereby 16-bit display data from the pallet A 1027 is subjected to the error diffusion processing for the conversion into 4-bit data corresponding to the FLCD which is a display device of the invention.

The error diffusion method has greater degree of gradation than the dither method, and is effective for the image information having high resolution.

<Variation 3>

Figure 20:
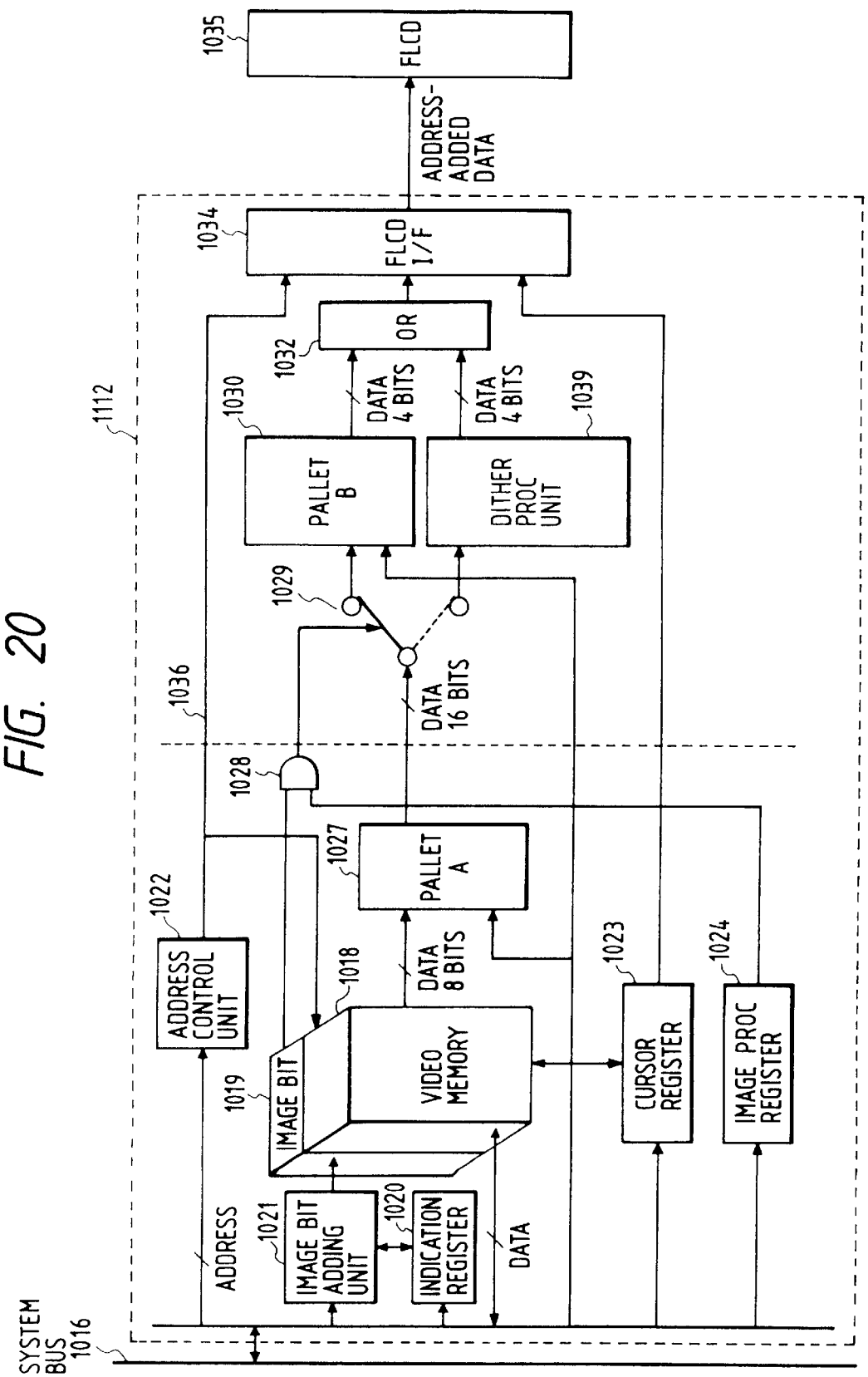
FIG. 20 is a block diagram of an FLCD controller according to a variation 3, wherein a dither processing is applied.

FIG. 20 is a block diagram of an FLCD controller according to a variation of the invention.

This variation is set forth in that the average density reserve processing 1031 which is one of the image processings in the second embodiment is replaced with a dither processing 1039, whereby 16-bit display data from the pallet A 1027 is subjected to the dither processing for the conversion into 4-bit data corresponding to the FLCD which is a display device of the invention.

The dither method can be implemented by the use of a simple circuit, and is effective for the output device having a relatively low resolution such as a display device, and since binarization for object lines is only needed, it has the advantage of being controllable compared with other methods such as an error diffusion method and an average density reserve method which require the peripheral image data in performing binarization, although the quality of display image may be degraded.

<Variation 4>

Figure 21:
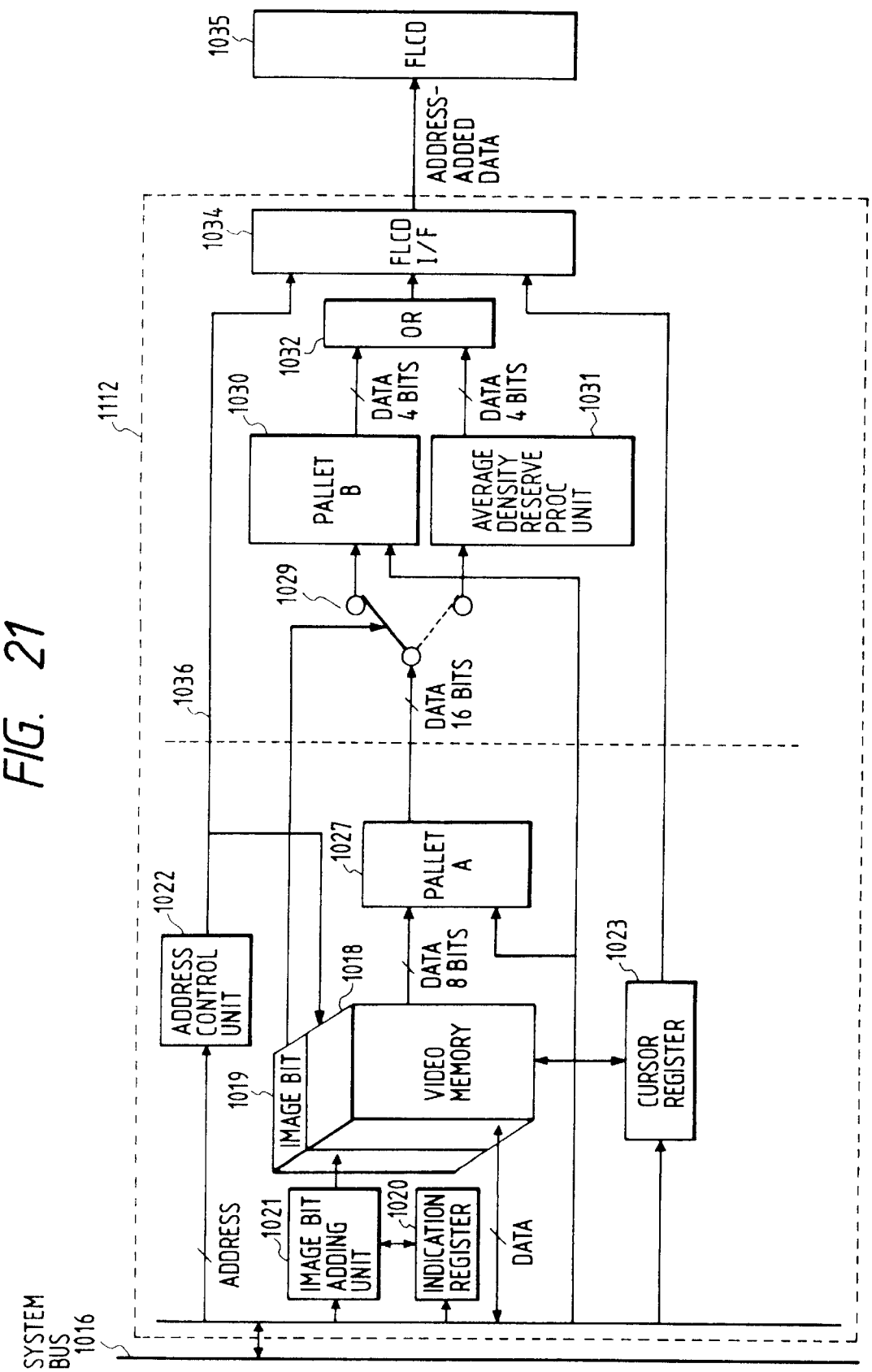
FIG. 21 is a block diagram of an FLCD controller according to a variation 4, wherein an image processing register is excluded.

FIG. 21 is a block diagram of an FLCD controller according to a variation of the invention.

This variation is set forth in that the image processing register 1024 and the AND circuit 1028 are excluded, and the switch 1029 uses directly the output from the image bit 1019.

Figure 22:
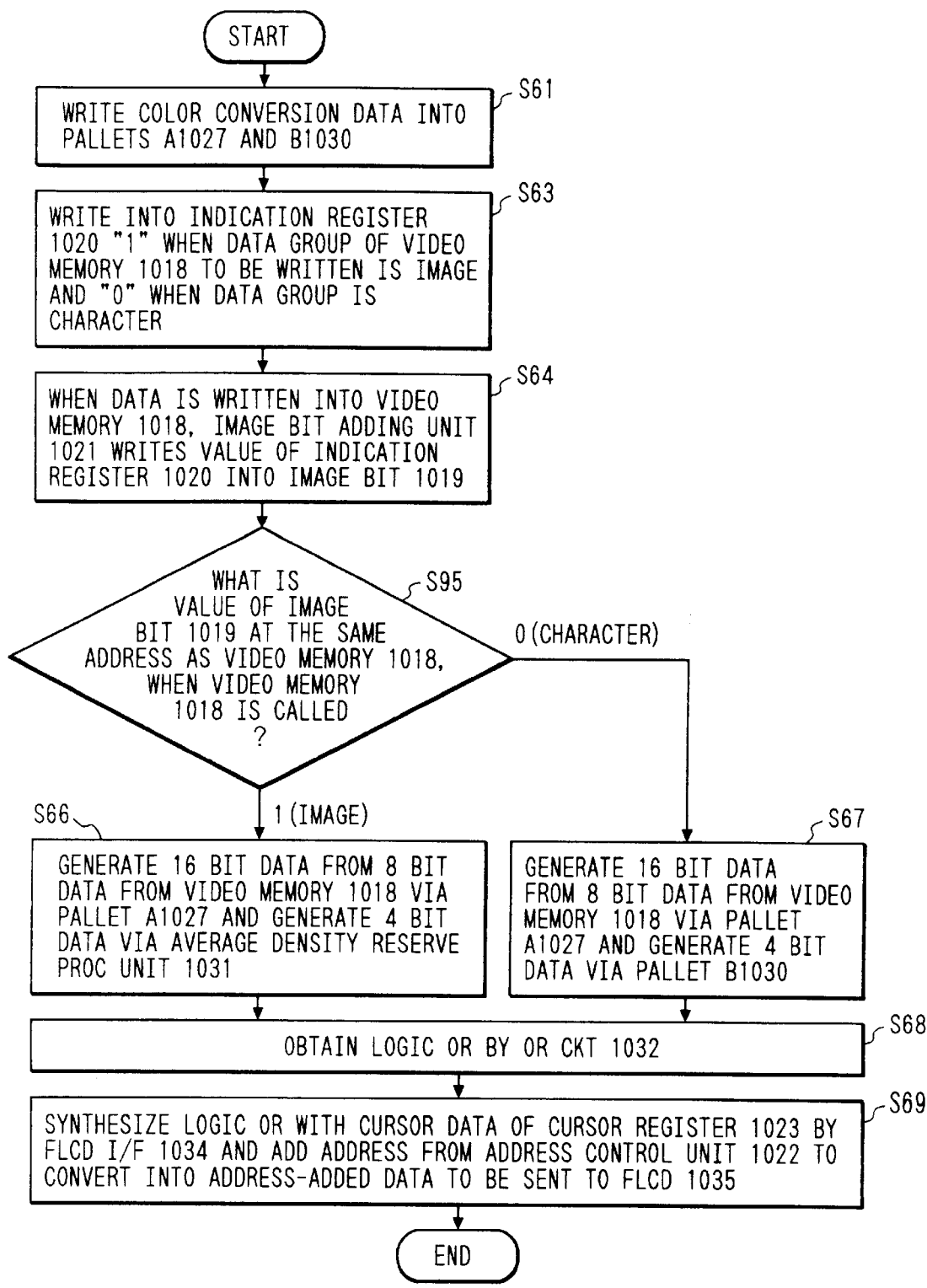
FIG. 22 is a flowchart of an FLCD controller according to the variation 4, wherein an image processing register is excluded.

FIG. 22 is a flowchart thereof.

This flowchart excludes step S62 in the second embodiment, which is a mode for compulsorily prohibiting the image processing. At step S95, when display data to the FLCD 1035 is called from the video memory 1018, the result of the value of the image bit 1019 indicating whether the image is at the same address as in the video memory is "1", that is, the display data is image, the procedure goes to step S66, or if the result is "0", that is, the display data is character, the procedure goes to step S67.

With the above configuration, this embodiment offers the following effects.

Figure 23:
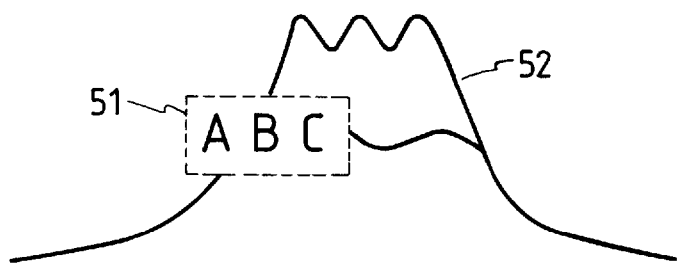
FIG. 23 is an example of an image processed with the apparatus according to the second embodiment of the present invention.
Figure 24:
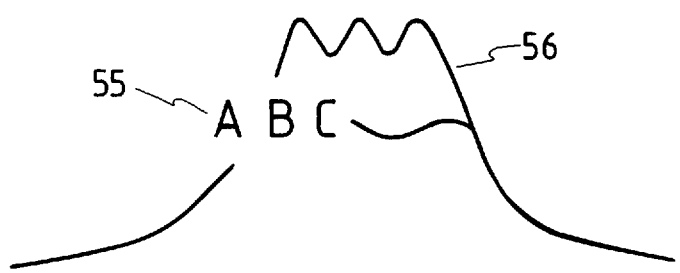
FIG. 24 is an example of an image processed conventionally.

(1) As the judgment as to whether to conduct the image processing can be made instantly at the same time as displaying the display data, the region in which image and character are complexly mixed can be simply processed at high speeds. FIG. 23 shows this result. The complexly mixed region where a character area 51 (enclosed by the dot line) is overlaid on an image area 52 as in this embodiment can be also processed at high speeds.

(2) As the character area is not subjected to image processing, the contour of character does not become obscure. This is shown in the character area 51 in FIG. 23, for example.

(3) As the display data after image processing and the cursor data are overlaid, cursor data being not subjected to image processing, the contour of cursor does not become obscure.

Since according to the embodiment of FIG. 17, the logic OR is made after the average density reserve processing, the error diffusion processing with an average density reserve method can be performed well.

While the embodiment as described above has been embodied with the error diffusion processing relying on the average density reserve method, this embodiment is not limited to such processing, but may be embodied by simply using an error diffusion processing.

According to this embodiment, image data is selected after error diffusion processing, based on characteristic information, so that error diffusion processing may not be affected detrimentally.

Third embodiment

Figure 25:
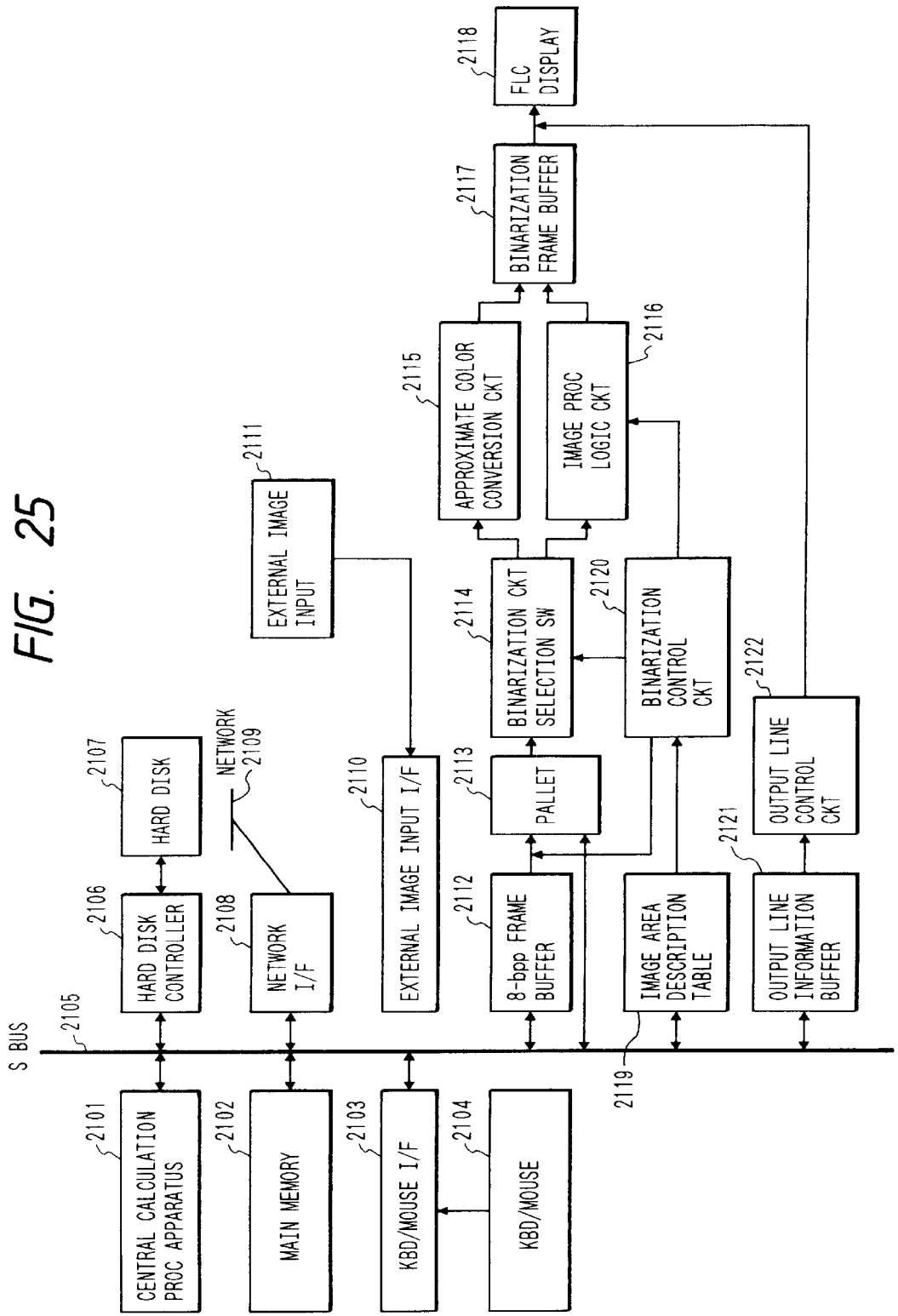
FIG. 25 is a block diagram showing the total system configuration according to a third embodiment of the present invention.

A third embodiment of the present invention will be described below with reference to the drawings. FIG. 25 is a block diagram showing the total configuration of an image display system, including an image display device of the present invention. In FIG. 25, 2101 is a central calculation processing unit of a host computer, 2102 is a main memory, 2103 is a keyboard/mouse interface, 2104 is a keyboard/mouse, 2105 is a system bus, 2106 is a hard disk controller, 2107 is a hard disk, 2108 is a network interface, and 2109 is a network. 2110 is an external image input interface for receiving data from an external image input 2111 and writing image data into a predetermined area of 8-bpp (8 bit/pixel) frame buffer 2112. Into the frame buffer 2112 is written image data upon an instruction of the central calculation processing unit 2101. A pallet 2113 converts pixel data (which is a unit of image data specifying the color indication of pixel for the display) in the image stored in the frame buffer 2112 into color data to be displayed on the display. A binarization circuit selection switch 2114 transfers timely color data received from the pallet 2113 to an approximate color conversion circuit 2115 or an image processing logic circuit 2116. The approximate color conversion circuit 2115 converts approximately color data generated by the pallet 2113 into displayable color on an FLC display 2118 for the transfer to a binarization frame buffer 2117. An image processing logic circuit 2116 applies image processing to pixel data in the frame buffer 2112 which has passed through the pallet 2113 for subsequent tranfer to the binarization frame buffer 2117. The binarization frame buffer 2117 is a frame buffer having bits corresponding one-to-one to sub-pixels of the FLC display 2118. The FLC display 2118 is a display device using a ferroelectric liquid crystal. An image area description table 2119 is a table in which image processing area and approximate color conversion area to be applied in binarization of data in the frame buffer 2112 are described. A binarization control circuit 2120 controls the binarization circuit selection switch 2114, the image processing logic circuit 2116 and the data transferred from the frame buffer 2112 to the pallet 2113, based on the image area description table. An output line information buffer 2121 stores information concerning the writing into the frame buffer 2112, which is passed from a software being executed by the central calculation processing unit 2101. An output line control circuit 2122 reads image information from the binarization frame buffer 2117 timely, based on the information stored in the output line information buffer 2121, and transfers and displays image information on to the FLC display 2118.

Figure 26:
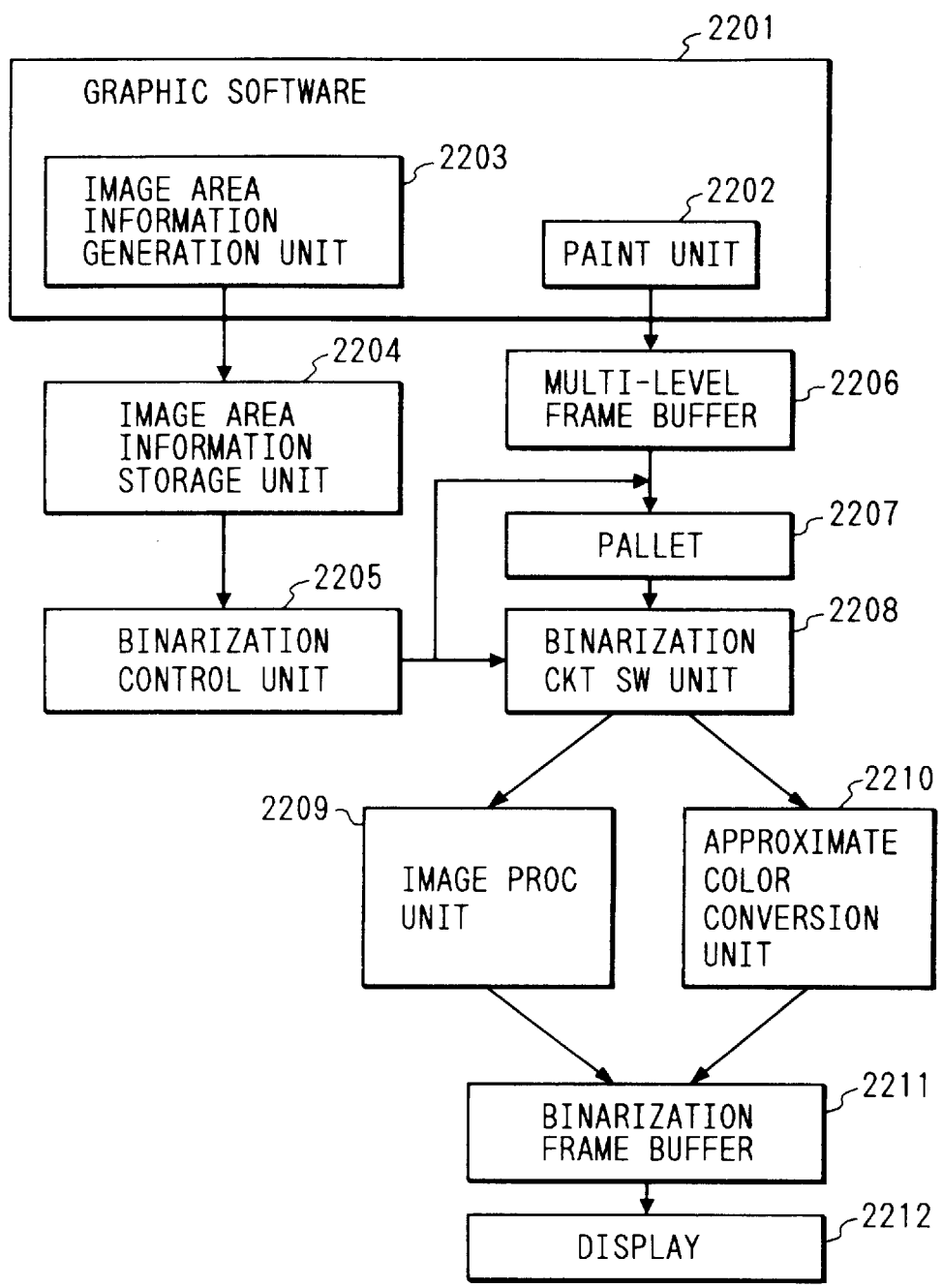
FIG. 26 is a block diagram showing the logical configuration according to the third embodiment of the present invention.

FIG. 26 is a logical configuration diagram of the present invention. A graphic software 2201 has a paint unit 2202 for painting image information into a multi-level frame buffer 2206. This multi-level frame buffer 2206 stores image information relating to the image to be displayed on a display 2212. A pallet 2207 converts image information in the multi-level frame buffer 2206 into color information as an index for the color table, except when the multi-level frame buffer 2206 stores color information itself, the color information being subsequently transferred to a binarization circuit switch unit 2208. On the other hand, the graphic software 2201 has an image area information generation unit 2202 for generating the information concerning the area to be displayed after image conversion or approximate color conversion, based on the information stored in the multi-level frame buffer 2206. This information is once stored in the image area information storage unit 2204. Further, the binarization control unit 2205 refers to this information to transfer multi-level image information from the multi-level frame buffer 2206 into the pallet 2207 for each area, as well as controlling the binarization circuit switch unit 2208 to transfer the information output from the pallet 2207 to either an image processing unit 2209 or an approximate color conversion unit 2210. The image processing unit 2209 and the approximate color conversion unit 2210 generate binarization image information from transferred information, respectively, for the storage into a binarization frame buffer 2211. The binarization image information stored in the binarization frame buffer 2211 is sequentially transferred to the display 2212 and displayed thereon.

In FIG. 26, the graphic software 2201 is loaded into the main memory 2102, and executed by the central calculation processing unit 2101. The image area information storage unit 2204 is implemented by the image area description table 2119, the binarization control unit 2205 by the binarization control circuit 2120, the binarization circuit switch unit 2208 by the binarization circuit selection switch 2114, the image processing unit 2209 by the image processing logic circuit 2116, and the approximate color conversion unit 2210 by the approximate color conversion circuit 2115.

Next, implementing the logical configuration of FIG. 26 in the embodiment of FIG. 25 will be described in detail.

First, the graphic software 2201 is an X window server (hereinafter abbreviated as X server) which is loaded into the main memory 2102 in FIG. 25, and executed by the central calculation processing unit 2101 (X or X Window System is a trademark by Massachusetts Institute of Technology). As well known, the X window system signifies the whole of a system consisting of an application program, typically, a plurality of application programs provided, each called a client, and a program called a server for actually effecting the painting on the frame buffer by treating a paint request from the client. The server and the client intercommunicate to each other, based on the standard called an X protocol.

Figure 27:
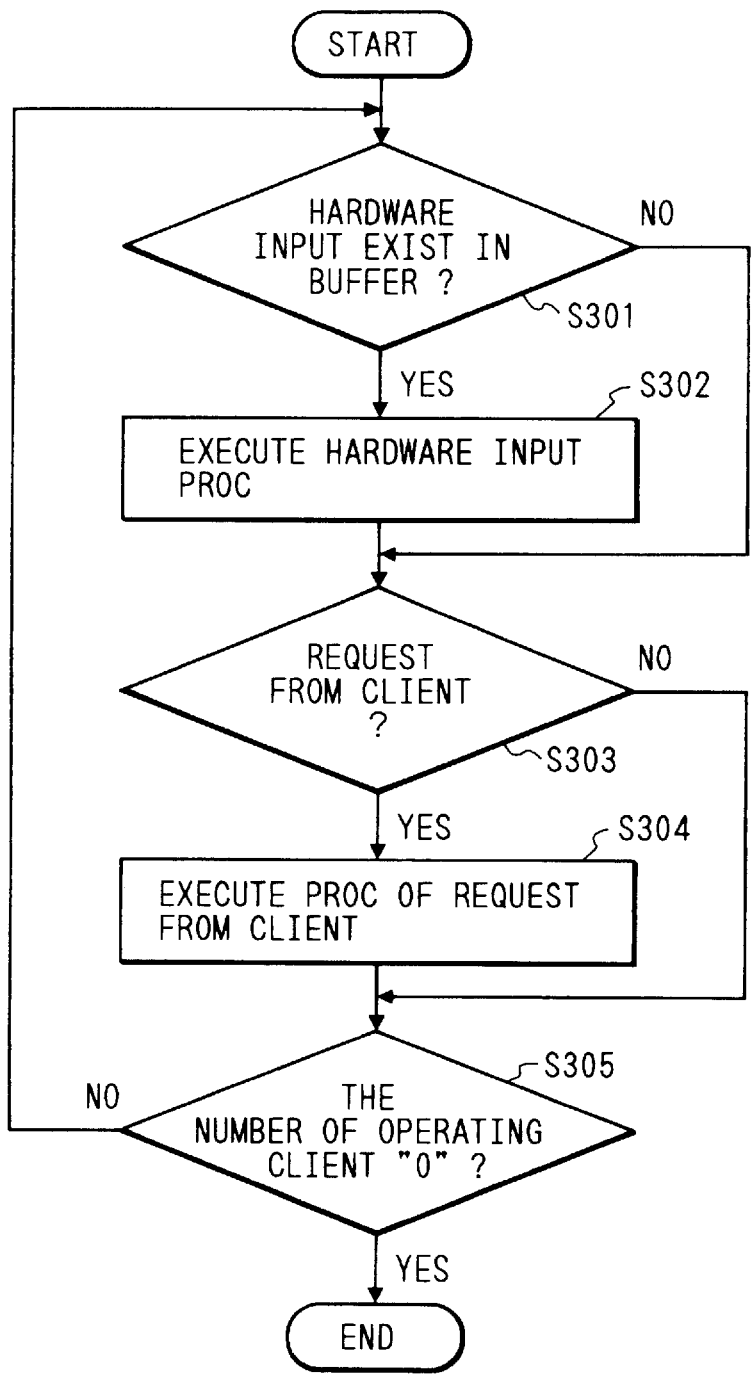
FIG. 27 is a flowchart showing schematically the internal processing of an X server.

FIG. 27 shows schematically the internal processing of the X server. At step S301, if there exists a hardware event or a keyboard input by the user, or a pointer operation, the hardware input processing is executed at step S302.

Figure 28:
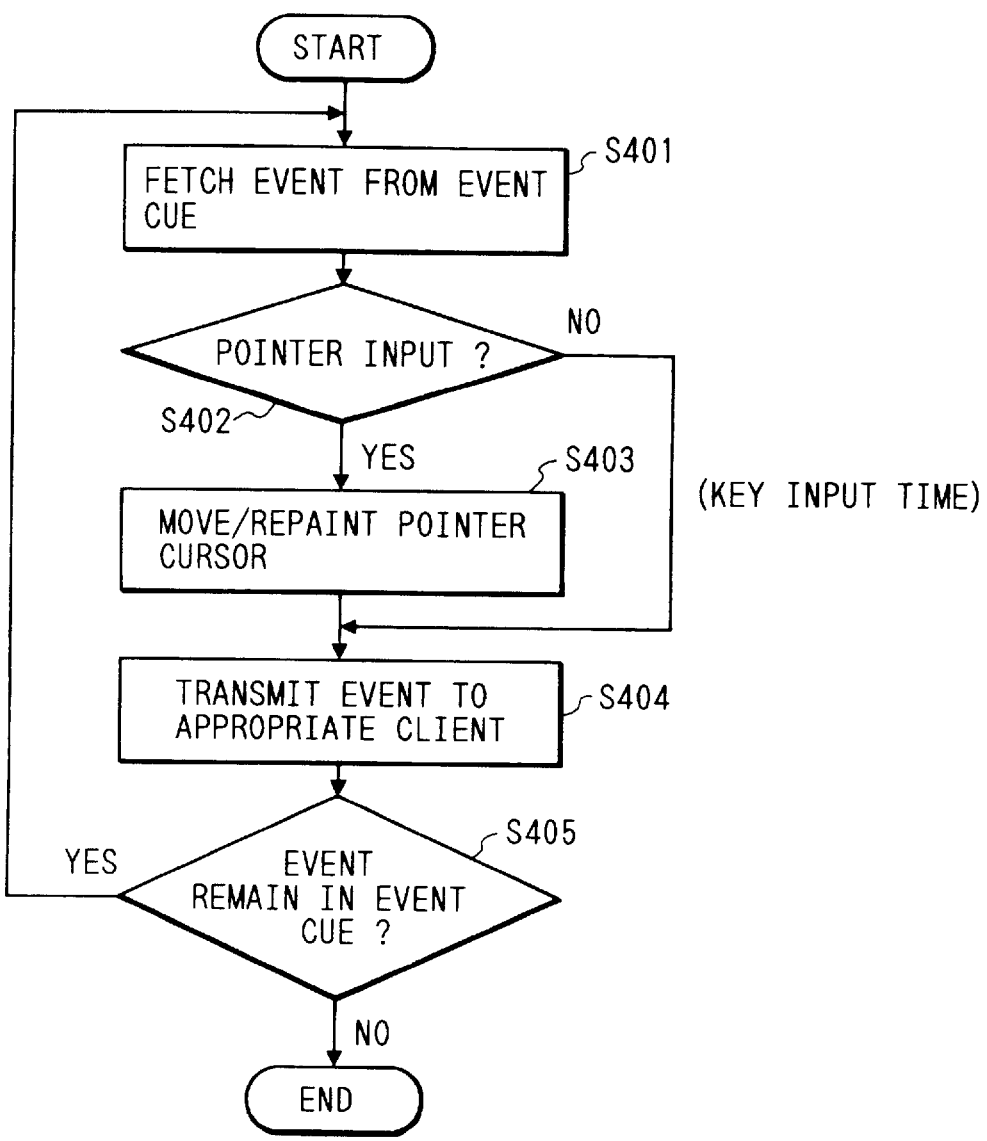
FIG. 28 is a flowchart showing the processing contents.

FIG. 28 shows in detail the processing content of step S302. In FIG. 28, at step S401, one event is fetched from an event cue. At step S402, the event is examined to determine whether or not the hardware event is a pointer input. If the answer is yes, pointer cursor is moved/repainted at step S403. Next, at step S404, the event is transmitted to an appropriate client to be informed of the occurrence of hardware event. At step S405, if any event remains in the event cue, the procedure returns to step S401, or otherwise is ended.

Turning back to FIG. 27, if any request from the client exists at step S303, the request is treated at step S304.

Figure 29:
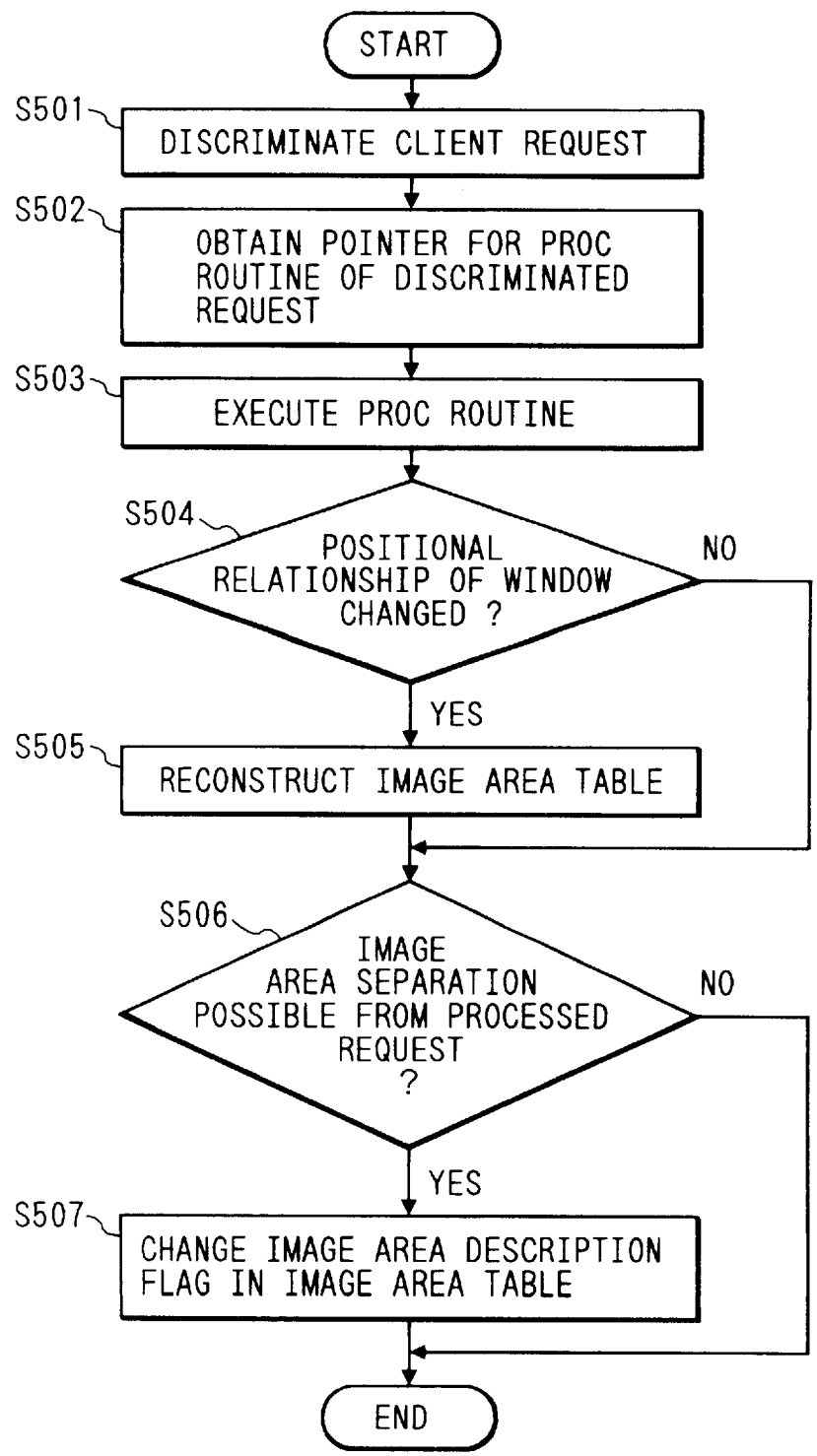
FIG. 29 is a flowchart showing the processing contents.

FIG. 29 shows in detail the processing content of step S304. At step S501, a client request is discriminated. A pointer to the processing routine of the request is obtained at step S502, and the processing routine is executed at step S503. Next, if any positional relationship of windows including overlapping condition of windows or the shape of window has changed in the request processing executed at previous step, the image area description table 2119 of FIG. 25 is reconstructed. The way of determining whether the positional relationship of windows has changed will be described below. The image area description table 2119 is constructed corresponding to each window of the X window system.

Herein, FIGS. 30A to 30C show the basic concept of a wondow management method in the X server. Within the X server, all the windows are managed in a hierarchical structure, with the root window (located most backwardly and spread over the entire screen) being a parent window at the highest rank. FIG. 30 illustrates the correspondence between the positional relationship of windows appearing on the screen and the window hierarchical structure managed by the X server. Each window has data structure referred to as a window construction (see FIG. 30C). Window construction has pointers (Window Ptr type) to previous and next brothers, first child, and final child, as shown in FIG. 30C. FIG. 30B shows the information link between parent, child and brothers. Window construction has information relating to the rectangular list of a portion partially hidden on the screen, which is referred to as a clip list, as will occur when a window is overlapped by another window.

Figure 31:
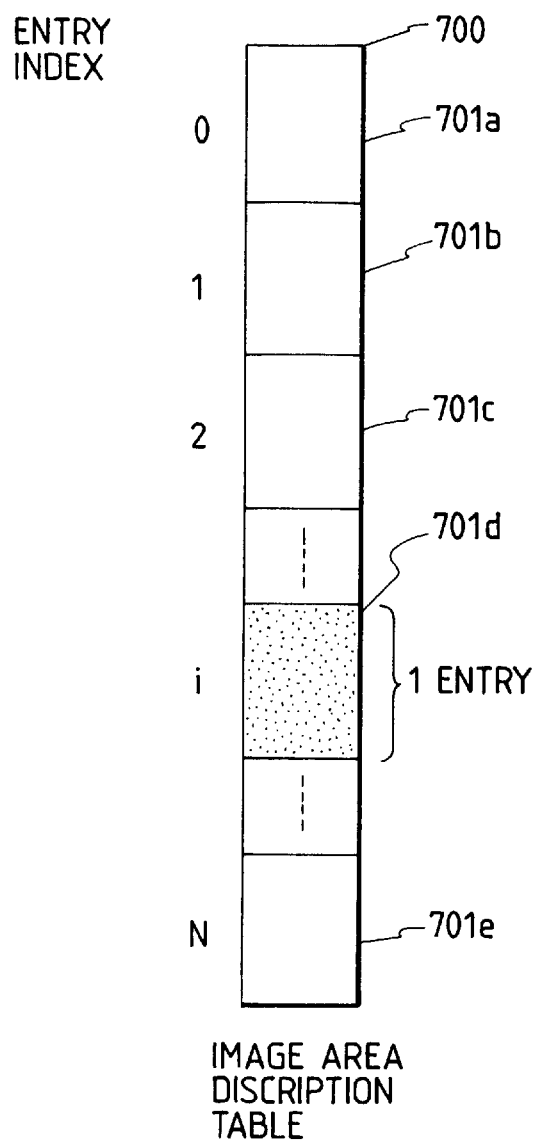
FIG. 31 is a diagram showing the internal configuration of an image area description table.
Figure 32:
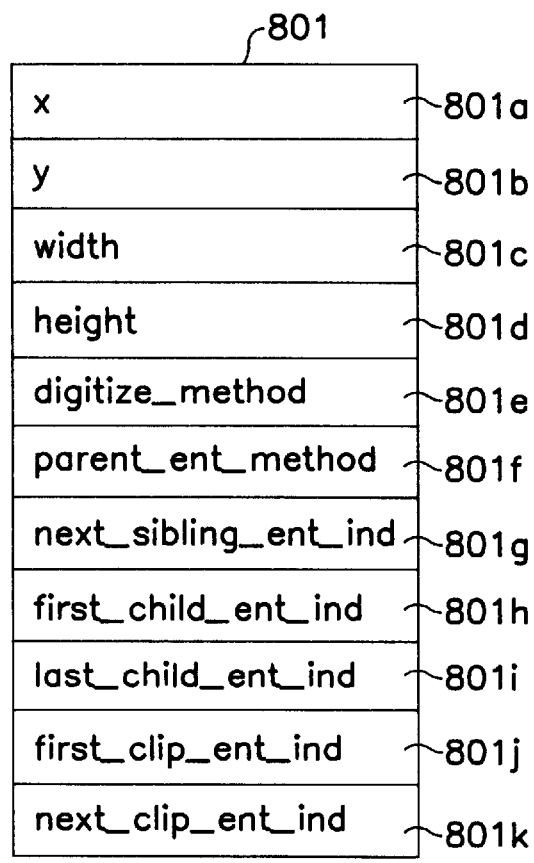
FIG. 32 is a diagram showing the internal configuration of entries.

FIG. 31 shows the internal structure of an image area description table 2701. The image area description table 2701 is comprised of N entries of 2701a, 2701b, 2701c, 2701d and 2701e. The values of N entries depend on the hardware design. The internal structure of respective entries is as shown in FIG. 32. Each entry of the image area description table 2701 describes one window or one clip area. They are all rectangular areas. However, when the window is described, $next\_clip\_ent\_ind$ is 0. Conversely, when the clip area is described, parent_ent_ind, next_sibling_ent_ind, first_child$_{ent}$_ind, last_child_ent_ind, and first_clip_ent_ind are made -1, while when the next clip area does not exist, next_clip_ent_ind is 0.

Turning back to FIG. 29, at step S505, the image area description table 2701 is reconstructed, using a window construction which the X server adopts for window management. The necessity of reconstruction is determined depending on the type of request from the client. That is, the reconstruction is enabled if the request corresponds to any one of the following instances.

Configure Window
Circulate Window
Destroy Window
Map Window
Unmap Window
UnmapSub Window
Reparent Window At step S506, if the image area separation, or the discrimination between the window for performing image processing and the window for performing approximate color conversion is possible from the request processed at step S503, the value of corresponding entry 801e digitize_method in the image area description table 2701 is set at step S507. This 10 image separation can be discriminated depending on the type of request. That is, when the request is any one of the followings, it is discriminated as indicated to the right.

| Put Image | Image processing |
|---|---|
| Image Text 8 | Approximate color conversion |
| Image Text 16 | Approximate color conversion |
| Poly Text 8 | Approximate color conversion |
| Poly Text 16 | Approximate color conversion |

Turning back to FIG. 27, at step S305, if the number of currently operating clients is not zero, the procedure returns to step S301, or otherwise, the procedure is ended.

The operation of the graphic program 2201 for generating the image area information has been thus described, and then the operation of binarization control circuit 2120 will be described below.

Figure 33:
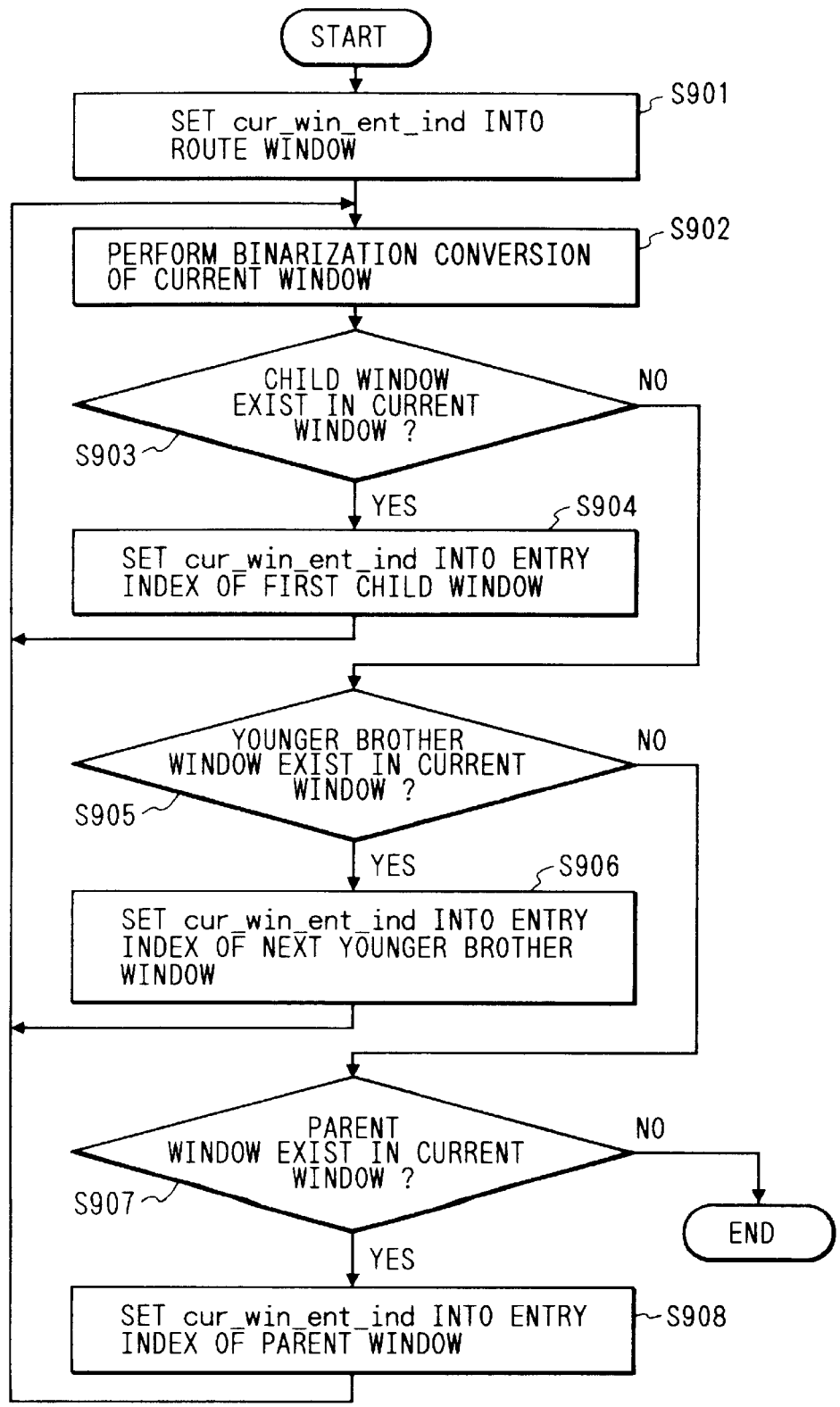
FIG. 33 is a flowchart showing the operation flow in a binarization control circuit.

FIG. 33 is a flowchart of the operation of binarization control circuit 2120. At step S901, cur_win_ent_ind is set into an image area description entry (=0) of the root window. At step S902, the binarization conversion of a current window specified by cur_win_ent_ind is performed.

Figure 34:
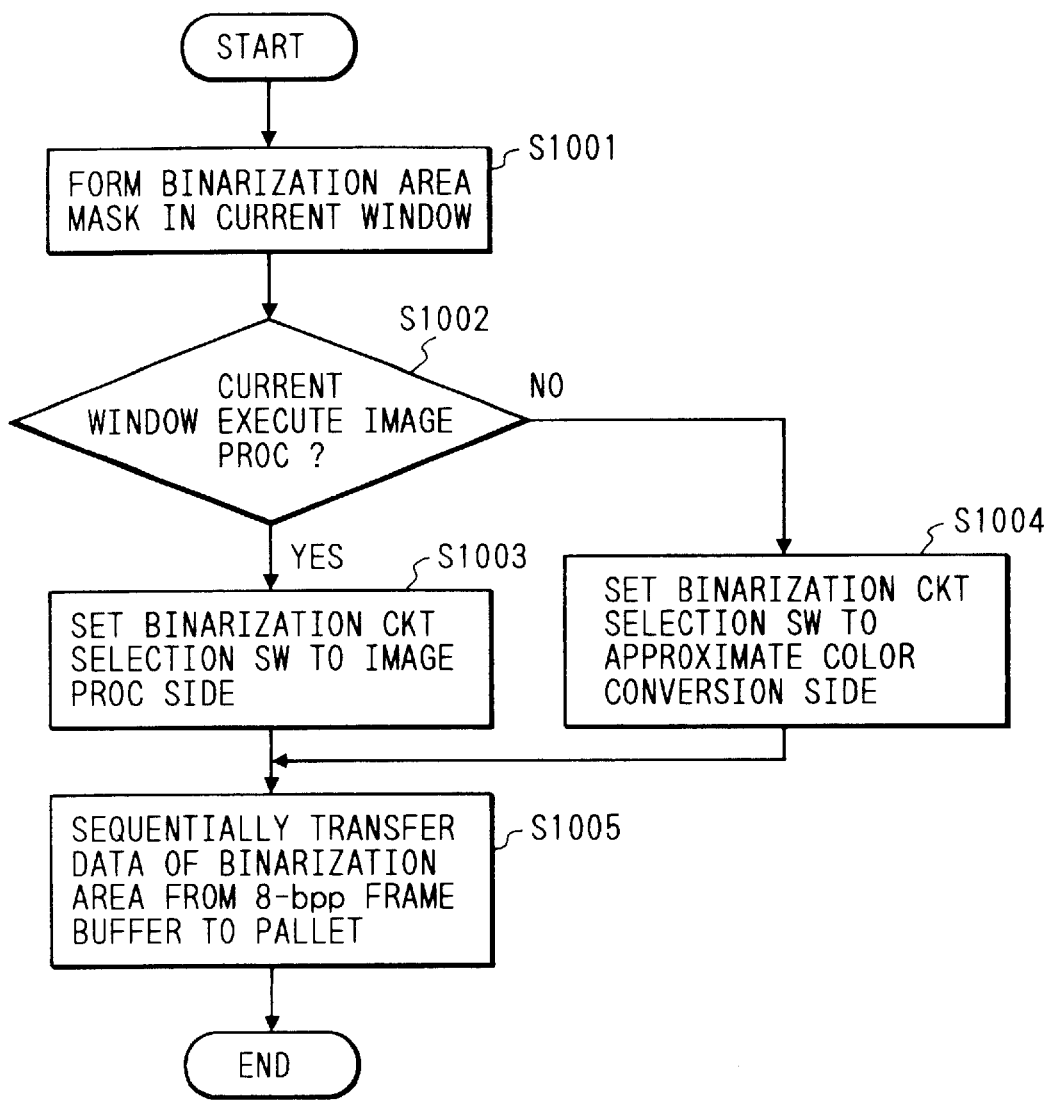
FIG. 34 is a flowchart showing the operation flow in a binarization control circuit.

FIG. 34 shows the details of step S902. At step S1001, a mask for binarization area in the current window, or a binarization area mask, is generated. By referring to 801e digitize_method in the current window, the binarization circuit selection switch 2114 is set to the image processing side if the digitize_method is 1, or set to the approximate color conversion side if it is 0. Then, at step S1005, using a binarization area mask, image data in the binarization area is sequentially transferred from the frame buffer 2112 to the pallet. At this time, the binarization control circuit 2120 also passes the binarization area mask to the image processing logic circuit 2116 to enable a correct binarization image processing.

In FIG. 33, the steps of S903 to S908 are binarization processing for all the windows in the image area description table 2119.

<Variation>

In the previously described embodiments, when the image processing method is not necessary to read out the data in the binarization frame buffer which stores processed image data, such as a dither method, the binarization frame buffer 2117 may be omitted.

Figure 35A:
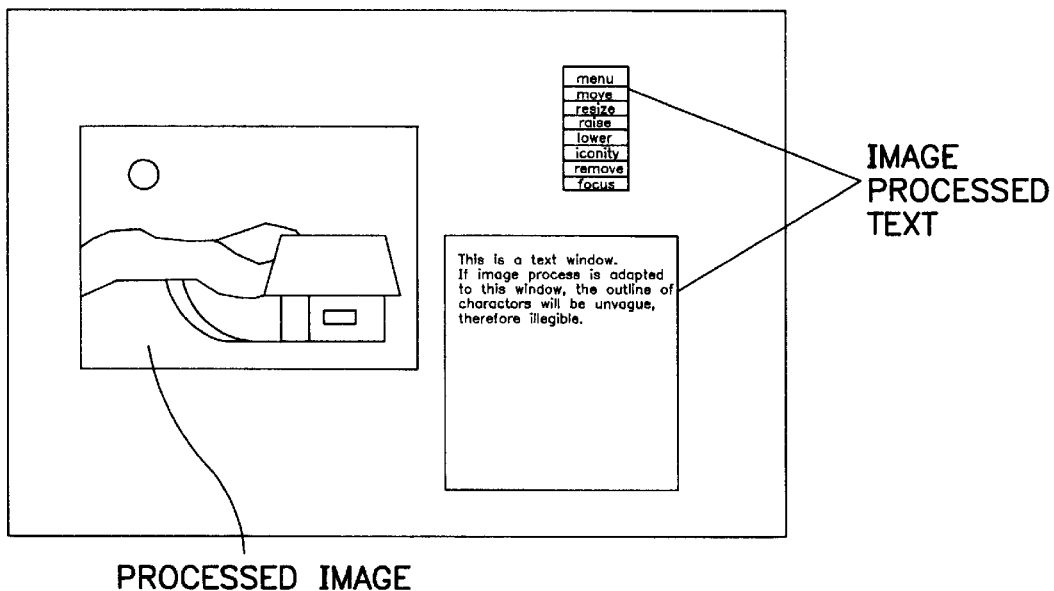
FIGS. 35A and 35B show display examples.
Figure 35B:
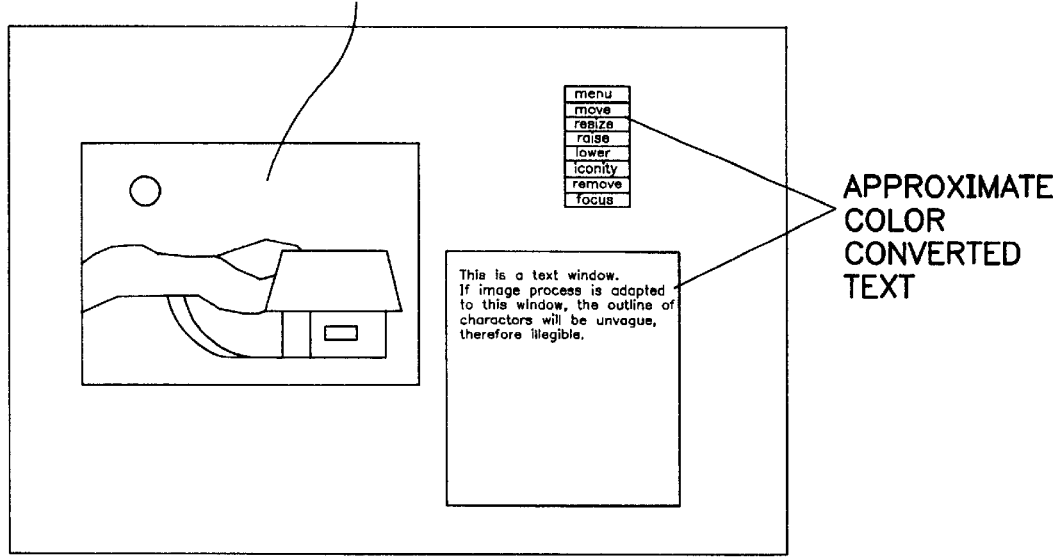

As above described, according to the above embodiment, there are provided image area information generating means for generating image area information for designating an area for displaying binarization image data to be obtained by image processing of image data in the multi-level frame buffer on the screen, and an area for displaying image data to be obtained by approximate color conversion, image area information storing means for storing said image area information, image processing means for performing image processing, based on pixel data in the frame buffer and color information generated by the pallet, approximate color conversion means for converting into color data to be displayable on the display, pixel data in the multi-level frame buffer and color information generated by the pallet, binarization circuit switch means for switching the transfer of pixel data in said multi-level frame buffer and color information generated by the pallet to said image processing means or approximate color conversion means, and binarization control means for controlling image data to be transferred from the multi-level frame buffer to the pallet, based on image area information stored in said image area information storing means, thereby appropriately switching said binarization circuit switch means to transfer necessary data to said image processing means, wherein image data for the portion of characters or symbols (see FIG. 35) obscure on the contour and less visible may be displayed by approximate color conversion, but not image processing, the display image having the number of visually displayable colors increased by image processing, so that the effect of higher visibility can be attained.

The present invention is not limited to the above embodiments, but various variations and modifications can be made within the scope of the claimed invention. In particular, the combination of the concept in each embodiment is contained within the scope of the present invention.

What is claimed is:

1. An apparatus for controlling a display capable of displaying m-level image data for each pixel, comprising:

display means for displaying image data;

memory means for storing image data having n-level for each pixel, with n being greater than m;

processing means for processing the image data readout from said memory means and generating processed image data having m-level for each pixel; and supplying means for supplying the processed image data generated by said processing means to said display means as display data, wherein said processing means includes, a first converting circuit for converting the image data having n-level for each pixel into first processed image data having m-level for each pixel by using a first converting method, a second converting circuit for converting the image data having n-level for each pixel into second processed image data having m-level for each pixel by using a second converting method different from the first converting method, and a switching circuit for selectively outputting the first or the second processed image data in accordance with a characteristic of an image represented by the image data stored in said memory means, and wherein said first and second converting circuits are independently arranged and are connected in parallel so that both the first and second converting circuits are capable of inputting the image data readout from said memory means.

2. An apparatus according to claim 1, further comprising a computer for supplying the image data having n-level for each pixel to said memory means.

3. An apparatus according to claim 1, wherein said display means has display elements using a ferroelectric liquid crystal.

4. An apparatus according to claim 1, further comprising discriminating means for discriminating whether an image represented by the image data having n-level is a character or an image for each pixel.

5. An apparatus according to claim 4, wherein said first converting circuit performs pseudo-halftone processing, and said switching circuit outputs the first processed image when an image is discriminated as an image for each pixel by said discriminating means.

6. An apparatus according to claim 5, wherein said pseudo-halftone processing is an error diffusion method.

7. An apparatus according to claim 6, wherein said pseudo-halftone processing is an average density reserve method.

8. A method for controlling a display capable of displaying m-level image data for each pixel, comprising the steps of:

storing image data having n-level for each pixel in a memory, with n being greater than m;

processing the image data readout from the memory and generating processed image data having m-level for each pixel; and supplying the processed image data to the display as display data, wherein the processing step includes the substeps of:

converting the image data having n-level for each pixel into first processed image data having m-level for each pixel by using a first converting circuit which performs a conversion conforming to a first converting method, converting the image data having n-level for each pixel into second processed image data having m-level for each pixel by using a second converting circuit which performs a conversion conforming to a second converting method different from the first converting method, and selecting the first or the second processed image data in accordance with a characteristic of an image represented by the image data stored in the memory, and wherein the first and second converting circuits are independently arranged and are connected in parallel so that both the first and second converting circuits are capable of inputting the image data readout from the memory.

* * * * *

UNITED STATES PATENT AND TRADEMARK OFFICE
CERTIFICATE OF CORRECTION

PATENT NO. : 5,838,291

DATED : November 17, 1998

INVENTOR(S) : Masamichi Ohshima et al.

It is certified that error appears in the above-identified patent and that said Letters Patent is hereby corrected as shown below:

COLUMN 7:

Line 53, "304a" should read --304 is a--.
Line 56, "witching" should read --switching--.

COLUMN 11:

Line 3, "2of" should read --2 of--.

COLUMN 15:

Line 27, "next_clip_ent_ind is 0." should read
  --next_clip_ent_ind is 0.--
Line 29, "child_ent_ind," should read --child_ent_ind,--.
Line 52, "10" should be deleted.

COLUMN 18:

Line 7, "claim 6," should read --claim 5,--.

Signed and Sealed this

Thirty-first Day of August, 1999

Attest:

Q. TODD DICKINSON

Attesting Officer

Acting Commissioner of Patents and Trademarks